(12) United States Patent
Yanai et al.

(10) Patent No.: US 8,057,867 B2
(45) Date of Patent: Nov. 15, 2011

(54) LIQUID CRYSTAL COMPOSITION AND LIQUID CRYSTAL DISPLAY DEVICE

(75) Inventors: Takayoshi Yanai, Ichihara (JP); Takashi Hiraoka, Ichihara (JP); Masayuki Saito, Ichihara (JP)

(73) Assignees: JNC Corporation, Tokyo (JP); Chisso Petrochemical Corporation, Tokyo (JP)

( * ) Notice: Subject to any disclaimer, the term of this patent is extended or adjusted under 35 U.S.C. 154(b) by 0 days.

(21) Appl. No.: 12/862,602

(22) Filed: Aug. 24, 2010

(65) Prior Publication Data

US 2011/0062384 A1 Mar. 17, 2011

(30) Foreign Application Priority Data

Sep. 15, 2009 (JP) ................. 2009-213056

(51) Int. Cl.
*C09K 19/30* (2006.01)
*C09K 19/12* (2006.01)
*C09K 19/20* (2006.01)

(52) U.S. Cl. ............... 428/1.1; 252/299.63; 252/299.66; 252/299.67

(58) Field of Classification Search .............. 428/1.1; 252/299.63, 299.66, 299.67
See application file for complete search history.

(56) References Cited

U.S. PATENT DOCUMENTS

| 5,439,613 | A | 8/1995 | Takeshita et al. | ....... 252/299.63 |
| 7,976,912 | B2 * | 7/2011 | Hiraoka et al. | ............ 428/1.1 |
| 7,976,913 | B2 * | 7/2011 | Hiraoka et al. | ............ 428/1.1 |
| 2010/0308266 | A1 * | 12/2010 | Yanai et al. | ........... 252/299.61 |

FOREIGN PATENT DOCUMENTS

| EP | 0 360 043 A1 | 3/1990 |
| EP | 0 609 566 A1 | 8/1994 |
| JP | 02-067232 | 3/1990 |
| JP | 05-229979 | 9/1993 |
| JP | 06-200251 | 7/1994 |

\* cited by examiner

*Primary Examiner* — Shean Wu
(74) *Attorney, Agent, or Firm* — Hogan Lovells US LLP

(57) ABSTRACT

Subject

The subject is to provide a liquid crystal composition that satisfies at least one of characteristics such as a high maximum temperature of a nematic phase, a low minimum temperature of a nematic phase, a small viscosity, a suitable optical anisotropy, a large dielectric anisotropy, a large elastic constant ratio, a small temperature dependence of the threshold voltage, a small frequency dependence of the dielectric anisotropy and a short helical pitch, or that is suitably balanced regarding at least two of the characteristics. The subject is to provide a STN device that has a short response time, a large contrast ratio, a low threshold voltage, a small electric power consumption, a steep voltage-transmission curve and a small light leak.

Means for Solving the Subject

The invention provides a nematic liquid crystal composition that include a specific optically active compound as a first component and a specific compound having a positively large dielectric anisotropy as a second component, and that optionally may include a specific compound having a high maximum temperature or a small viscosity as a third component and a specific compound having a positively large dielectric anisotropy as a fourth component, and provides a liquid crystal display device containing this composition.

16 Claims, No Drawings

LIQUID CRYSTAL COMPOSITION AND LIQUID CRYSTAL DISPLAY DEVICE

BACKGROUND OF THE INVENTION

1. Field of the Invention

The invention relates mainly to a liquid crystal composition suitable for use in a super twisted nematic device and so forth, and a super twisted nematic device containing the composition.

2. Related Art

In a liquid crystal display device, a classification based on an operating mode for liquid crystals includes phase change (PC), twisted nematic (TN), super twisted nematic (STN), electrically controlled birefringence (ECB), optically compensated bend (OCB), in-plane switching (IPS), vertical alignment (VA) and polymer sustained alignment (PSA). A classification based on a driving mode in the device includes a passive matrix (PM) and an active matrix (AM). The PM is further classified into static, multiplex and so forth, and the AM is classified into a thin film transistor (TFT), a metal-insulator-metal (MIM) and so forth. The TFT is further classified into amorphous silicon and polycrystal silicon. The latter is classified into a high temperature type and a low temperature type according to the production process. A classification based on a light source includes a reflection type utilizing natural light, a transmission type utilizing a backlight and a semi-transmission type utilizing both natural light and a backlight.

These devices contain a liquid crystal composition having suitable characteristics. The liquid crystal composition has a nematic phase. General characteristics of the composition should be improved to give a STN device having good general characteristics. Table 1 below summarizes the relationship between the general characteristics of the two. The general characteristics of the composition will be further explained based on a commercially available STN device. The temperature range of a nematic phase relates to the temperature range in which the device can be used. A desirable maximum temperature of the nematic phase is approximately 70° C. or higher and a desirable minimum temperature of the nematic phase is approximately −20° C. or lower. The viscosity of the composition relates to the response time of the device. A short response time is desirable to display moving images on the device. Accordingly, a small viscosity of the composition is desirable. A small viscosity at a low temperature is more desirable.

The optical anisotropy of the composition relates to the contrast ratio of the device. The product ($\Delta n \times d$) of the optical anisotropy ($\Delta n$) of the composition and the cell gap (d) of the device is designed so as to maximize the contrast ratio. In this case, the optical anisotropy of the composition is mainly in the range of approximately 0.10 to approximately 0.20. A large dielectric anisotropy in the composition contributes to a low threshold voltage and a small electric power consumption in the device. Accordingly, a large dielectric anisotropy is desirable. A large elastic constant ratio (K33/K11) of the composition contributes to a steep voltage-transmission curve and a large contrast ratio of the device. Accordingly, a large elastic constant ratio is desirable.

A composition having positive dielectric anisotropy is used for a STN device. Examples of the liquid crystal composition having positive dielectric anisotropy are disclosed in the following patent documents. An example of a liquid crystal composition including an optically active compound is disclosed in the following patent No. 3. However, the helical pitch was not sufficiently short.

No. 1: JP H02-067232 A (1990); No. 2: JP H05-229979 A (1993); and No. 3: JP H06-200251 A (1994).

It is especially desirable that a composition has a high maximum temperature of a nematic phase, a low minimum temperature of a nematic phase, a small viscosity, a suitable optical anisotropy, a large dielectric anisotropy and a large elastic constant ratio and that the threshold voltage has a small temperature dependence and the dielectric anisotropy is hardly effected by the frequency applied to the device in the range of a high temperature to a low temperature.

SUMMARY OF THE INVENTION

The invention concerns a liquid crystal composition that has a nematic phase and includes two components, wherein a first component is at least one optically active compound selected from the group of compounds represented by formula (1), and a second component is at least one compound selected from the group of compounds represented by formula (2), and also concerns a liquid crystal display device containing the composition:

TABLE 1

General Characteristics of Composition and STN Device

| No. | General Characteristics of Composition | General Characteristics of STN Device |
|---|---|---|
| 1 | wide temperature range of a nematic phase | wide usable temperature range |
| 2 | small viscosity[1] | short response time |
| 3 | suitable optical anisotropy | large contrast ratio |
| 4 | positively large dielectric anisotropy | low threshold voltage and small electric power consumption |
| 5 | large elastic constant ratio (K33/K11) | steep voltage-transmission curve and large contrast ratio |

[1] A composition can be injected into a liquid crystal cell in a shorter period of time.

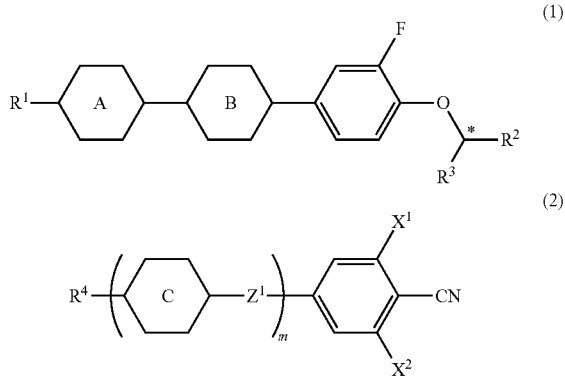

wherein $R^1$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; $R^2$ and $R^3$ are different each other, and are alkyl having 1 to 12 carbons or alkenyl having 2 to 12 carbons; $R^4$ is alkyl having 1 to 12 carbons, alkoxy having 1 to 12 carbons or alkenyl having 2 to 12 carbons; the ring A and the ring B are each independently 1,4-cyclohexylene or 1,4-phenylene; the ring C is independently 1,4-cyclohexylene, 1,4-phenylene, 2-fluoro-1,4-phenylene, 3-fluoro-1,4-phenylene, 3,5-difluoro-1,4-phenylene or 1,3-dioxane-2,5-diyl; $Z^1$ is independently carbonyloxy, difluoromethyleneoxy or a single bond; m is 1, 2 or 3; and $X^1$ and $X^2$ are each independently hydrogen or fluorine.

When a combination of two or more compounds represented by formula (1) is used, it is desirable for the compounds to have the same direction of twist for decreasing the helical pitch of the composition and for decreasing the amount of compounds represented by formula (1). Incidentally, a combination with a compound having the same direction of twist or a combination with a compound having the reverse direction of twist is reasonable for adjusting the temperature dependence of the helical pitch length in the composition.

DETAILED DESCRIPTION OF THE INVENTION

The terms used in the specification and claims are defined as follows. The liquid crystal composition and the liquid crystal display device of the invention may occasionally be abbreviated to "the composition" and "the device," respectively. A liquid crystal display device is a generic term for a liquid crystal display panel and a liquid crystal display module. "A liquid crystal compound" is a generic term for a compound having a liquid crystal phase such as a nematic phase and a smectic phase, and also for a compound having no liquid crystal phases but being useful as a component of a composition. Such a compound has a six-membered ring such as 1,4-cyclohexylene and 1,4-phenylene, and has a rod-like molecular structure. An optically active compound other than the first component or a polymerizable compound may occasionally be added to the composition. Even in the case where this compound is liquid crystalline, the compound is classified as an additive herein. At least one compound selected from the group of compounds represented by formula (1) may occasionally be abbreviated to "the compound (1)." "The compound (1)" means one compound, or two or more compounds represented by formula (1). The same rules apply to compounds represented by the other formulas. "Arbitrary" is used not only in cases when the position is arbitrary but also in cases when the number is arbitrary. However, it is not used in cases when the number is 0 (zero).

A higher limit of the temperature range of a nematic phase may occasionally be abbreviated to "the maximum temperature." A lower limit of the temperature range of a nematic phase may occasionally be abbreviated to "the minimum temperature." When characteristics such as optical anisotropy are explained, values which are obtained according to the measuring methods described in Examples will be used. A first component means one compound, or two or more compounds. "A ratio of the first component" is expressed as a weight ratio (part by weight) of the first component when the weight of the liquid crystal composition excluding the first component is set to 100 parts. "A ratio of the second component" is expressed as a percentage by weight (% by weight) of the second component based on the weight of the liquid crystal composition excluding the first component. The same rules apply to "a ratio of a third component" and "a ratio of a fourth component." A ratio of an additive mixed with the composition is expressed as a percentage by weight (% by weight) or weight parts per million (ppm) based on the total weight of the liquid crystal composition.

The symbol $R^1$ is used for a plurality of compounds in the chemical formulas of component compounds. Arbitrary two of $R^1$ may be identical or different in these compounds. In one case, for example, $R^1$ of the compound (1-1) is ethyl and $R^1$ of the compound (1-2) is ethyl. In another case, $R^1$ of the compound (1-1) is ethyl and $R^1$ of the compound (1-2) is propyl. The same rule applies to the symbols $R^4$, $X^1$ and so forth. In chemical formulas, "CL" stands for chlorine.

One of the advantages of the invention is to provide a liquid crystal composition that satisfies at least one of characteristics such as a high maximum temperature of a nematic phase, a low minimum temperature of the nematic phase, a small viscosity, a suitable optical anisotropy, a large dielectric anisotropy, a large elastic constant ratio, a small temperature dependence of the threshold voltage, a small frequency dependence of the dielectric anisotropy and a short helical pitch. Another advantage of the invention is to provide a liquid crystal composition that is suitably balanced regarding at least two of the characteristics. A further advantage of the invention is to provide a liquid crystal display device that contains the composition. An additional advantage of the invention is to provide a composition that has a suitable optical anisotropy, a large dielectric anisotropy and so forth, and is to provide a STN device that has a short response time, a large contrast ratio, a low threshold voltage, a small electric power consumption, a steep voltage-transmission curve, a small light leak and so forth.

The liquid crystal composition of the invention satisfied at least one of characteristics such as a high maximum temperature of a nematic phase, a low minimum temperature of the nematic phase, a small viscosity, a suitable optical anisotropy, a large dielectric anisotropy, a large elastic constant ratio, a small temperature dependence of the threshold voltage, a small frequency dependence of the dielectric anisotropy and a short helical pitch. The liquid crystal composition was suitably balanced regarding at least two of the characteristics. The liquid crystal display device contained the composition. The composition had a suitable optical anisotropy, a large dielectric anisotropy and so forth, and a STN device had a short response time, a large contrast ratio, a low threshold voltage, a small electric power consumption, a steep voltage-transmission curve and a small light leak.

The invention includes the following items.

Item 1. A liquid crystal composition that has a nematic phase and includes two components, wherein a first component is at least one optically active compound selected from the group of compounds represented by formula (1), and a second component is at least one compound selected from the group of compounds represented by formula (2):

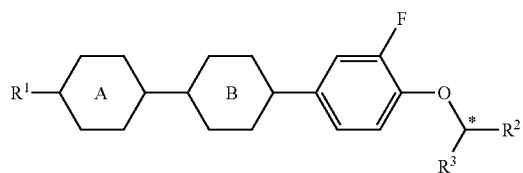
(1)

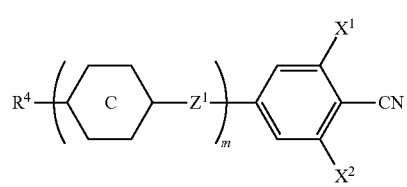
(2)

wherein $R^1$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; $R^2$ and $R^3$ are different each other, and are alkyl having 1 to 12 carbons or alkenyl having 2 to 12 carbons; $R^4$ is alkyl having 1 to 12 carbons, alkoxy having 1 to 12 carbons or alkenyl having 2 to 12 carbons; the ring A and the ring B are each independently 1,4-cyclohexylene or 1,4-phenylene; the ring C is independently 1,4-cyclohexylene, 1,4-phenylene, 2-fluoro-1,4-phenylene, 3-fluoro-1,4-phenylene, 3,5-difluoro-1,4-phenylene or 1,3-dioxane-2,5-diyl; $Z^1$ is independently carbonyloxy, difluoromethyleneoxy or a single bond; m is 1, 2 or 3; and $X^1$ and $X^2$ are each independently hydrogen or fluorine.

Item 2. The liquid crystal composition according to item 1, wherein the sum of the number of carbons of $R^2$ and $R^3$ in formula (1) is an integer from 3 to 10.

Item 3. The liquid crystal composition according to item 1 or 2, wherein the first component is at least one compound selected from the group of compounds represented by formula (1-1) to formula (1-3):

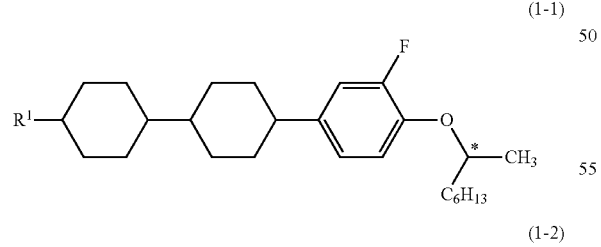
(1-1)

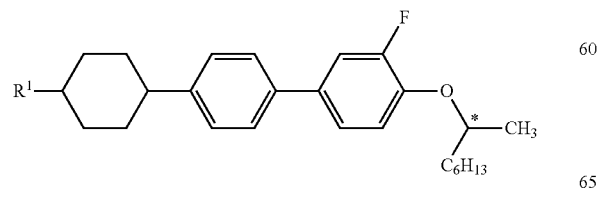
(1-2)

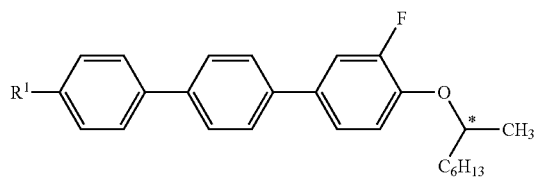
(1-3)

wherein $R^1$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

Item 4. The liquid crystal composition according to any one of items 1 to 3, wherein the ratio of the first component is in the range of approximately 0.01 part to approximately 5 parts by weight based on 100 parts by weight of the liquid crystal composition excluding the first component.

Item 5. The liquid crystal composition according to any one of items 1 to 4, wherein the second component is at least one compound selected from the group of compounds represented by formula (2-1) to formula (2-7):

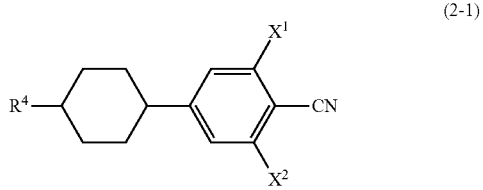
(2-1)

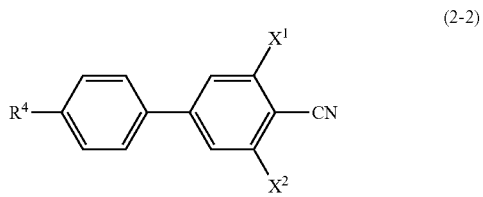
(2-2)

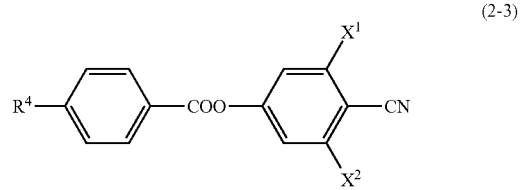
(2-3)

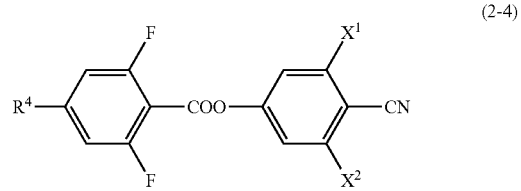
(2-4)

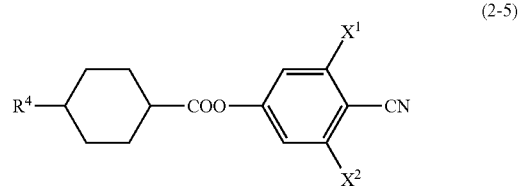
(2-5)

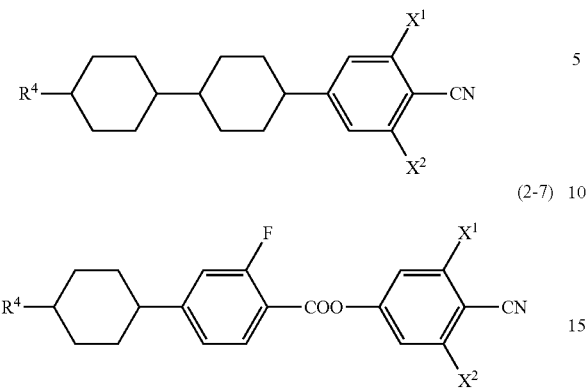

(2-6)

(2-7)

wherein $R^4$ is alkyl having 1 to 12 carbons, alkoxy having 1 to 12 carbons or alkenyl having 2 to 12 carbons; and $X^1$ and $X^2$ are each independently hydrogen or fluorine.

Item 6. The liquid crystal composition according to item 5, wherein the second component is at least one compound selected from the group of compounds represented by formula (2-1).

Item 7. The liquid crystal composition according to item 5, wherein the second component is at least one compound selected from the group of compounds represented by formula (2-3).

Item 8. The liquid crystal composition according to item 5, wherein the second component is a mixture of at least one compound selected from the group of compounds represented by formula (2-1) and at least one compound selected from the group of compounds represented by formula (2-3).

Item 9. The liquid crystal composition according to any one of items 1 to 8, wherein the ratio of the second component is in the range of approximately 5% to approximately 70% by weight based on the weight of the liquid crystal composition excluding the first component.

Item 10. The liquid crystal composition according to any one of items 1 to 9, further including at least one compound selected from the group of compounds represented by formula (3) as a third component:

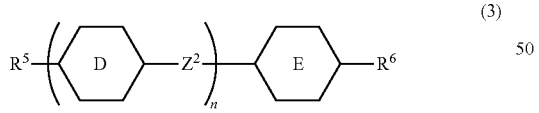

(3)

wherein $R^5$ and $R^6$ are each independently alkyl having 1 to 12 carbons, alkoxy having 1 to 12 carbons, alkenyl having 2 to 12 carbons, alkenyl having 2 to 12 carbons in which arbitrary hydrogen is replaced by fluorine, or alkoxymethyl having 2 to 12 carbons; the ring D and the ring E are each independently 1,4-cyclohexylene, 1,4-phenylene, 2-fluoro-1,4-phenylene, 3-fluoro-1,4-phenylene, 2,5-difluoro-1,4-phenylene or pyrimidine-2,5-diyl; $Z^2$ is independently ethylene, ethynylene, carbonyloxy or a single bond; and n is 1, 2 or 3.

Item 11. The liquid crystal composition according to item 10, wherein the third component is at least one compound selected from the group of compounds represented by formula (3-1) to formula (3-17):

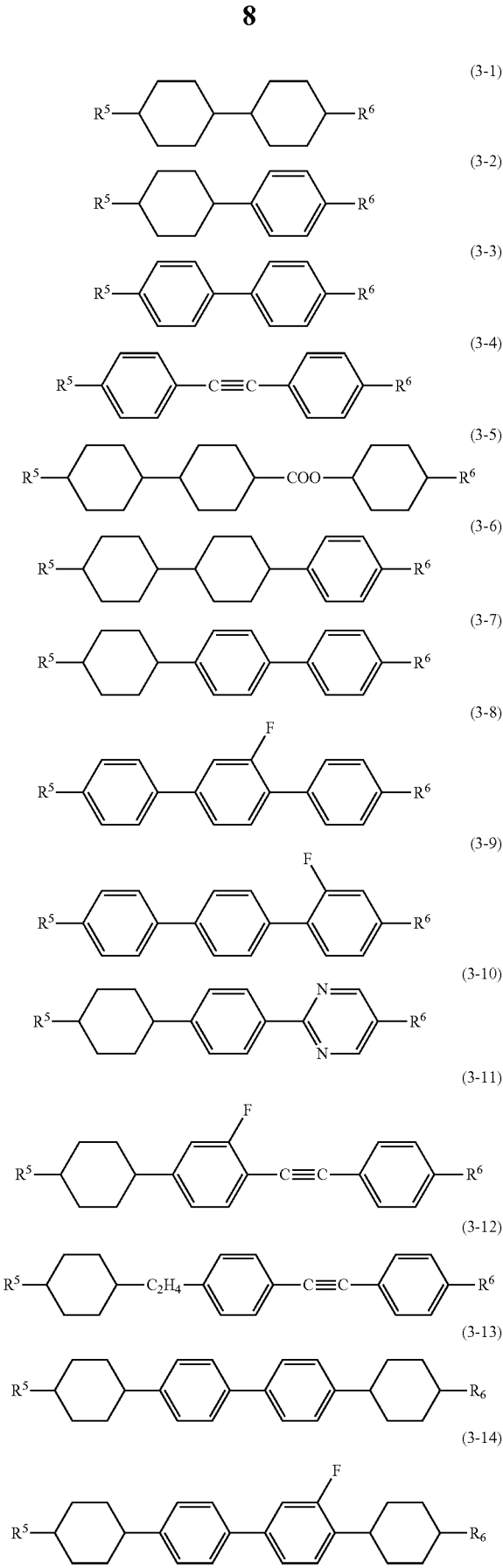

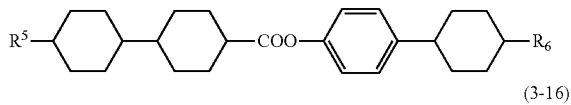
(3-15)

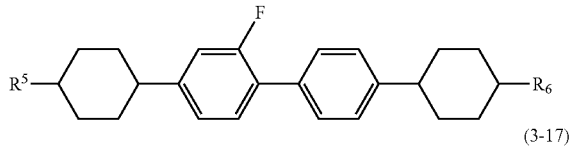
(3-16)

(3-17)

wherein $R^5$ and $R^6$ are each independently alkyl having 1 to 12 carbons, alkoxy having 1 to 12 carbons, alkenyl having 2 to 12 carbons, alkenyl having 2 to 12 carbons in which arbitrary hydrogen is replaced by fluorine, or alkoxymethyl having 2 to 12 carbons.

Item 12. The liquid crystal composition according to item 11, wherein the third component is at least one compound selected from the group of compounds represented by formula (3-1).

Item 13. The liquid crystal composition according to item 11, wherein the third component is a mixture of at least one compound selected from the group of compounds represented by formula (3-1) and at least one compound selected from the group of compounds represented by formula (3-6).

Item 14. The liquid crystal composition according to item 11, wherein the third component is a mixture of at least one compound selected from the group of compounds represented by formula (3-1) and at least one compound selected from the group of compounds represented by formula (3-11).

Item 15. The liquid crystal composition according to item 11, wherein the third component is a mixture of at least one compound selected from the group of compounds represented by formula (3-1) and at least one compound selected from the group of compounds represented by formula (3-12).

Item 16. The liquid crystal composition according to item 11, wherein the third component is a mixture of at least one compound selected from the group of compounds represented by formula (3-1), at least one compound selected from the group of compounds represented by formula (3-6), and at least one compound selected from the group of compounds represented by formula (3-11).

Item 17. The liquid crystal composition according to item 11, wherein the third component is a mixture of at least one compound selected from the group of compounds represented by formula (3-1), at least one compound selected from the group of compounds represented by formula (3-6), and at least one compound selected from the group of compounds represented by formula (3-12).

Item 18. The liquid crystal composition according to any one of items 10 to 17, wherein the ratio of the third component is in the range of approximately 30% to approximately 95% by weight based on the weight of the liquid crystal composition excluding the first component.

Item 19. The liquid crystal composition according to any one of items 1 to 18, further including at least one compound selected from the group of compounds represented by formula (4) as a fourth component:

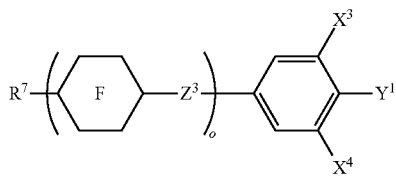
(4)

wherein $R^7$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; the ring F is independently 1,4-cyclohexylene or 1,4-phenylene; $Z^3$ is independently carbonyloxy or a single bond; o is 1 or 2; $X^3$ and $X^4$ are each independently hydrogen or fluorine; and $Y^1$ is chlorine or fluorine.

Item 20. The liquid crystal composition according to item 19, wherein the fourth component is at least one compound selected from the group of compounds represented by formula (4-1) to formula (4-6):

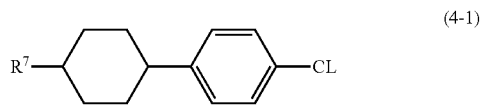
(4-1)

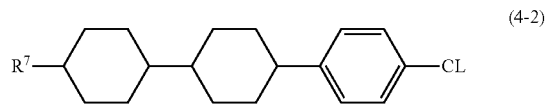
(4-2)

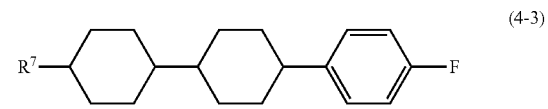
(4-3)

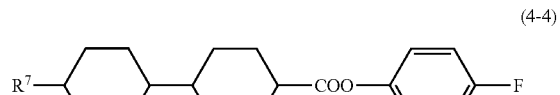
(4-4)

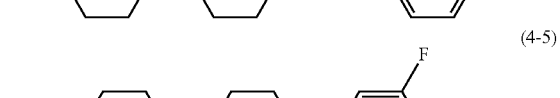
(4-5)

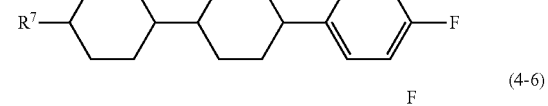
(4-6)

wherein $R^7$ is an alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

Item 21. The liquid crystal composition according to item 20, wherein the fourth component is at least one compound selected from the group of compounds represented by formula (4-4).

Item 22. The liquid crystal composition according to any one of items 19 to 21, wherein the ratio of the fourth component is in the range of approximately 5% to approximately 50% by weight based on the weight of the liquid crystal composition excluding the first component.

Item 23. A liquid crystal display device containing the liquid crystal composition according to any one of items 1 to 22.

The invention further includes the following items: (1) the composition described above in which the maximum temperature of a nematic phase is approximately 70° C. or higher and the minimum temperature of the nematic phase is approximately −20° C. or lower; (2) the composition described above that further includes an optically active compound; (3) a STN device that contains the composition described above; (4) a device that has a transmission type or a reflection type and contains the composition described above; (5) use of the composition described above as a composition having a nematic phase; and (6) use of the composition described above as an optically active composition.

The composition of the invention will be explained in the following order. First, the constitution of component compounds in the composition will be explained. Second, main characteristics of the component compounds and main effects of the compounds on the composition will be explained. Third, a combination of components in the composition, desirable ratios of the component compounds and the basis thereof will be explained. Fourth, a desirable embodiment of the component compounds will be explained. Fifth, examples of the component compounds will be shown. Sixth, additives that may be mixed with the composition will be explained. Seventh, methods for synthesizing the component compounds will be explained. Last, use of the composition will be explained.

First, the constitution of component compounds in the composition will be explained. The compositions of the invention are classified into the composition A and the composition B. In addition to the compound (1), the compound (2), the compound (3) and/or the compound (4), the composition A may further include any other liquid crystal compound, an additive and an impurity. "Any other liquid crystal compound" is different from the compound (1), the compound (2), the compound (3) and the compound (4). Such a liquid crystal compound is mixed with the composition for the purpose of adjusting characteristics of the composition. The additive includes an optically active compound other than the first component, a coloring matter and an antioxidant. The optically active compound is mixed with the composition for the purpose of inducing a helical structure and giving a twist angle in liquid crystals. The coloring matter is mixed with the composition for adjusting to a device having a guest host (GH) mode. The antioxidant is mixed with the composition in order to prevent a decrease in specific resistance caused by heating in air. The impurity is a compound and so forth which contaminated the component compounds in a process such as their synthesis. Even in the case where the compound is liquid crystalline, it is classified as an impurity herein.

The composition B consists essentially of compounds selected from the group of the compound (1), the compound (2), the compound (3) and the compound (4). The term "essentially" means that the composition may include an additive and an impurity, but does not include any liquid crystal compounds other than these component compounds. The composition B has a smaller number of components than the composition A. The composition B is preferable to the composition A in view of cost reduction. The composition A is preferable to the composition B in view of the fact that physical properties can be further adjusted by adding any other liquid crystal compound.

Second, main characteristics of the component compounds and main effects of the compounds on characteristics of the composition will be explained. The main characteristics of the component compounds are summarized in Table 2 on the basis of the effects of the invention. In Table 2, the symbol L stands for "large" or "high", the symbol M stands for "medium", and the symbol S stands for "small" or "low." The symbols L, M and S are classified on the basis of a qualitative comparison among the component compounds, and 0 (zero) means that "a value is nearly zero."

TABLE 2

| Characteristics of Compounds | | | |
|---|---|---|---|
| | Compounds | | |
| | Compound (2) | Compound (3) | Compound (4) |
| Maximum temperature | S-L | S-L | S-M |
| Viscosity | M-L | S-L | M |
| Optical Anisotropy | S-M | S-L | M |
| Dielectric Anisotropy | M-L | 0 | S-M |

Main effects of the component compounds on the characteristics of the composition upon mixing the component compounds with the composition are as follows. The compound (1) decreases the helical pitch. The compound (2) increases the dielectric anisotropy. The compound (3) increases the optical anisotropy or decrease the viscosity. The compound (4) decreases the minimum temperature.

Third, a combination of the components in the composition, desirable ratios of the components and the basis thereof will be explained. The combination of the components in the composition is the first and second components, the first, second and third components, the first, second and fourth components, and the first, second, third and fourth components. A desirable combination of the components in the composition is the first, second and third components.

A desirable ratio of the first component is approximately 0.01 part by weight or more and is approximately 5 parts by weight or less. A more desirable ratio is in the range of approximately 0.05 part to approximately 3 parts by weight. An especially desirable ratio is in the range of approximately 0.1 part to approximately 2 parts by weight.

A desirable ratio of the second component is approximately 5% by weight or more for increasing the dielectric anisotropy and is approximately 70% by weight or less for decreasing the minimum temperature. A more desirable ratio is in the range of approximately 10% to approximately 65% by weight. An especially desirable ratio is in the range of approximately 15% to approximately 60% by weight.

A desirable ratio of the third component is approximately 30% by weight or more for increasing the optical anisotropy or for decreasing the viscosity, and is approximately 95% by weight or less for increasing the dielectric anisotropy. A more desirable ratio is in the range of approximately 35% to approximately 90% by weight. An especially desirable ratio is in the range of approximately 40% to approximately 85% by weight.

A desirable ratio of the fourth component is approximately 5% by weight or more for decreasing the minimum temperature, and is approximately 50% by weight or less for decreasing the viscosity. A more desirable ratio is in the range of approximately 5% to approximately 45% by weight. An especially desirable ratio is in the range of approximately 5% to approximately 40% by weight.

Fourth, a desirable embodiment of the component compounds will be explained. $R^1$ and $R^7$ are each independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine. Desirable $R^1$ or $R^7$ is alkyl having 1 to 12 carbons for increasing the stability to ultraviolet light or heat. $R^2$ and $R^3$ are each independently alkyl having 1 to 12 carbons or alkenyl having 2 to 12 carbons. Desirable $R^2$ or $R^3$ is alkyl having 1 to 12 carbons for increasing the stability to ultraviolet light or heat. $R^4$ is alkyl having 1 to 12 carbons, alkoxy having 1 to 12 carbons or alkenyl having 2 to 12 carbons. Desirable $R^4$ is alkyl having 1 to 12 carbons for increasing the stability to ultraviolet light or heat. $R^5$ and $R^6$ are each independently alkyl having 1 to 12 carbons, alkoxy having 1 to 12 carbons, alkenyl having 2 to 12 carbons, alkenyl having 2 to 12 carbons in which arbitrary hydrogen is replaced by fluorine, or alkoxymethyl having 2 to 12 carbons. Desirable $R^5$ is alkenyl having 2 to 12 carbons for decreasing the minimum temperature or for decreasing the viscosity. Desirable $R^6$ is alkyl having 1 to 12 carbons for increasing the stability to ultraviolet light or heat.

Desirable alkyl is methyl, ethyl, propyl, butyl, pentyl, hexyl, heptyl or octyl. A more desirable alkyl is ethyl, propyl, butyl, pentyl or heptyl for decreasing the viscosity.

Desirable alkoxy is methoxy, ethoxy, propoxy, butoxy, pentyloxy, hexyloxy or heptyloxy. A more desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. A more desirable alkenyl is vinyl, 1-propenyl, 3-butenyl or 3-pentenyl for decreasing the viscosity. A desirable configuration of —CH═CH— in the alkenyl depends on the position of the double bond. Trans is preferable in the alkenyl such as 1-propenyl, 1-butenyl, 1-pentenyl, 1-hexenyl, 3-pentenyl and 3-hexenyl for decreasing the viscosity and for something. Cis preferable in the alkenyl such as 2-butenyl, 2-pentenyl and 2-hexenyl. In the alkenyl, straight-chain alkenyl is preferable to branched-chain alkenyl.

Desirable examples of alkenyl in which arbitrary hydrogen is replaced by fluorine are 2,2-difluorovinyl, 3,3-difluoro-2-propenyl, 4,4-difluoro-3-butenyl, 5,5-difluoro-4-pentenyl and 6,6-difluoro-5-hexenyl. More desirable examples are 2,2-difluorovinyl and 4,4-difluoro-3-butenyl for decreasing the viscosity.

Desirable alkoxymethyl is methoxymethyl, ethoxymethyl, propoxymethyl, butoxymethyl or pentyloxymethyl. More desirable alkoxymethyl is methoxymethyl for decreasing the viscosity.

The ring A and the ring B are each independently 1,4-cyclohexylene or 1,4-phenylene. A desirable ring A or ring B is 1,4-cyclohexylene for decreasing the minimum temperature. The ring C is 1,4-cyclohexylene, 1,4-phenylene, 2-fluoro-1,4-phenylene, 3-fluoro-1,4-phenylene, 3,5-difluoro-1,4-phenylene or 1,3-dioxane-2,5-diyl. Arbitrary two of the ring C may be identical or different when m is 2 or 3. A desirable ring C is 1,4-cyclohexylene for increasing the maximum temperature or decreasing the viscosity. The ring D and the ring E are each independently 1,4-cyclohexylene, 1,4-phenylene, 2-fluoro-1,4-phenylene, 3-fluoro-1,4-phenylene, 2,5-difluoro-1,4-phenylene or pyrimidine-2,5-diyl. Arbitrary two of the ring D may be identical or different when n is 2 or 3. A desirable ring D or ring E is 1,4-cyclohexylene for decreasing the viscosity and 1,4-phenylene for increasing the optical anisotropy. The ring F is 1,4-cyclohexylene or 1,4-phenylene. Arbitrary two of the ring F may be identical or different when o is 2 or 3. A desirable ring F is 1,4-cyclohexylene for increasing the maximum temperature or decreasing the viscosity.

$Z^1$ is carbonyloxy, difluoromethyleneoxy or a single bond, and arbitrary two of $Z^1$ may be identical or different when m is 2 or 3. Desirable $Z^1$ is a single bond for decreasing the viscosity. $Z^2$ is ethylene (—CH$_2$CH$_2$—), ethynylene (—C≡C—), carbonyloxy or a single bond, and arbitrary two of $Z^2$ may be identical or different when n is 2 or 3. Desirable $Z^2$ is a single bond for decreasing the viscosity. $Z^3$ is independently carbonyloxy or a single bond, and arbitrary two of $Z^3$ may be identical or different when o is 2. A desirable $Z^3$ is carbonyloxy for increasing the maximum temperature.

$X^1$, $X^2$, $X^3$ and $X^4$ are each independently hydrogen or fluorine. A desirable $X^1$, $X^2$, $X^3$ or $X^4$ is fluorine for increasing the dielectric anisotropy.

$Y^1$ is chlorine or fluorine. Desirable $Y^1$ is fluorine for decreasing the minimum temperature.

m is 1, 2 or 3. Desirable m is 1 for decreasing the viscosity. n is 1, 2 or 3. Desirable n is 1 for decreasing the viscosity. o is 1 or 2. Desirable o is 2 for decreasing the minimum temperature.

Fifth, examples of the component compounds will be shown. In the desirable compounds described below, $R^8$, $R^{15}$, $R^{16}$ and $R^{20}$ are each independently straight-chain alkyl having 1 to 12 carbons. $R^9$, $R^{12}$, $R^{13}$ and $R^{19}$ are each independently straight-chain alkyl having 1 to 12 carbons or straight-chain alkenyl having 2 to 12 carbons. $R^{10}$ is straight-chain alkyl having 1 to 12 carbons, straight-chain alkenyl having 2 to 12 carbons, or alkenyl having 2 to 12 carbons in which arbitrary hydrogen is replaced by fluorine. $R^{11}$, $R^{14}$ and $R^{18}$ are each independently straight-chain alkyl having 1 to 12 carbons or straight-chain alkoxy having 1 to 12 carbons. $R^{17}$ is straight-chain alkyl having 1 to 12 carbons, straight-chain alkenyl having 2 to 12 carbons or straight-chain alkoxymethyl having 2 to 12 carbons. With regard to the configuration of 1,4-cyclohexylene in these compounds, trans is preferable to cis for increasing the maximum temperature.

Desirable compound (1) are the compound (1-1-1) to the compound (1-3-1). More desirable compound (1) are the compound (1-1-1) and the compound (1-2-1). Especially desirable compound (1) is the compound (1-2-1). Desirable compound (2) are the compound (2-1-1) to the compound (2-1-3), the compound (2-2-1), the compound (2-3-1) to the compound (2-3-3), the compound (2-4-1), the compound (2-5-1), the compound (2-6-1) to the compound (2-6-2) and the compound (2-7-1). More desirable compound (2) are the compound (2-1-1), the compound (2-1-2) and the compound (2-3-3). Especially desirable compound (2) are the compound (2-1-1) and the compound (2-3-3). Desirable compound (3) are the compound (3-1-1) to the compound (3-17-1). More desirable compound (3) are the compound (3-1-1), the compound (3-2-1), the compound (3-4-1), the compound (3-6-1), the compound (3-11-1) and the compound (3-12-1). Especially desirable compound (3) are the compound (3-1-1), the compound (3-6-1), the compound (3-11-1) and the compound (3-12-1). Desirable compound (4) are the compound (4-1-1) to the compound (4-6-1). More desirable compound (4) is the compound (4-4-1).

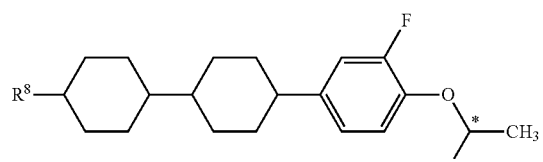 (1-1-1)
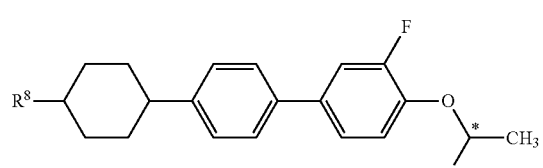 (1-2-1)
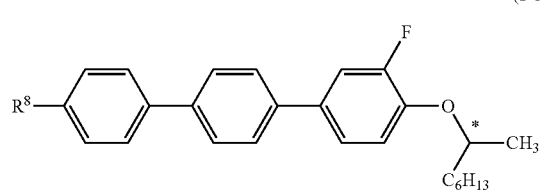 (1-3-1)
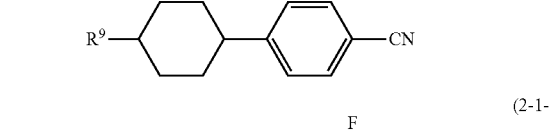 (2-1-1)
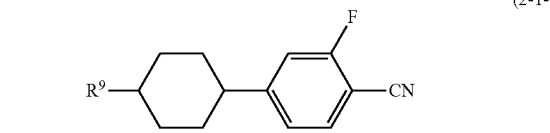 (2-1-2)
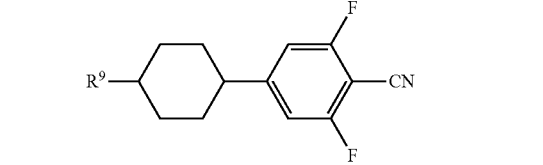 (2-1-3)
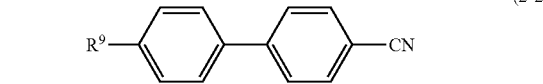 (2-2-1)
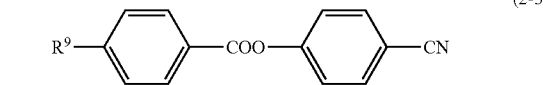 (2-3-1)
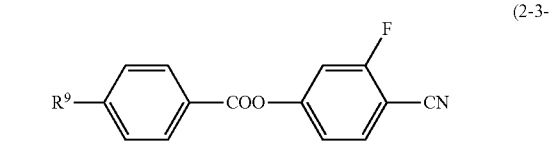 (2-3-2)
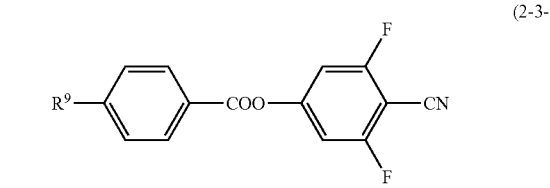 (2-3-3)
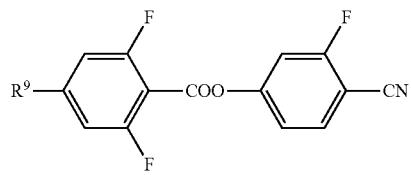 (2-4-1)
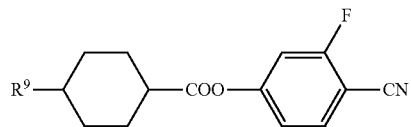 (2-5-1)
 (2-6-1)
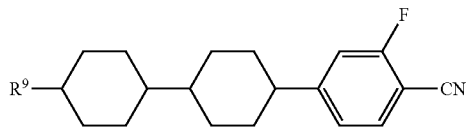 (2-6-2)
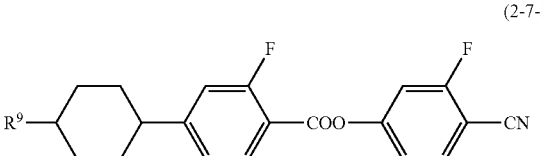 (2-7-1)
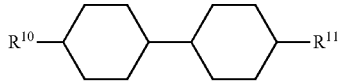 (3-1-1)
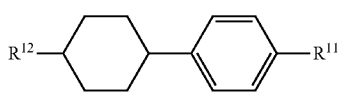 (3-2-1)
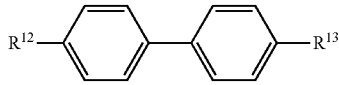 (3-3-1)
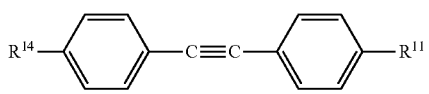 (3-4-1)
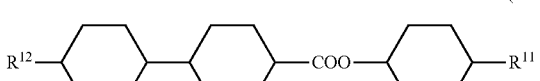 (3-5-1)
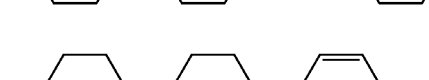 (3-6-1)
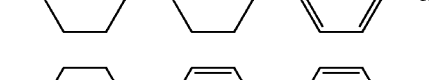 (3-7-1)
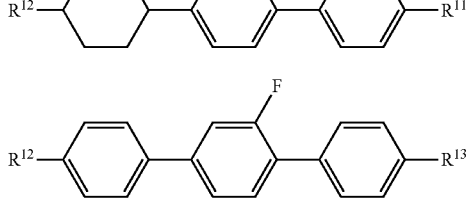 (3-8-1)

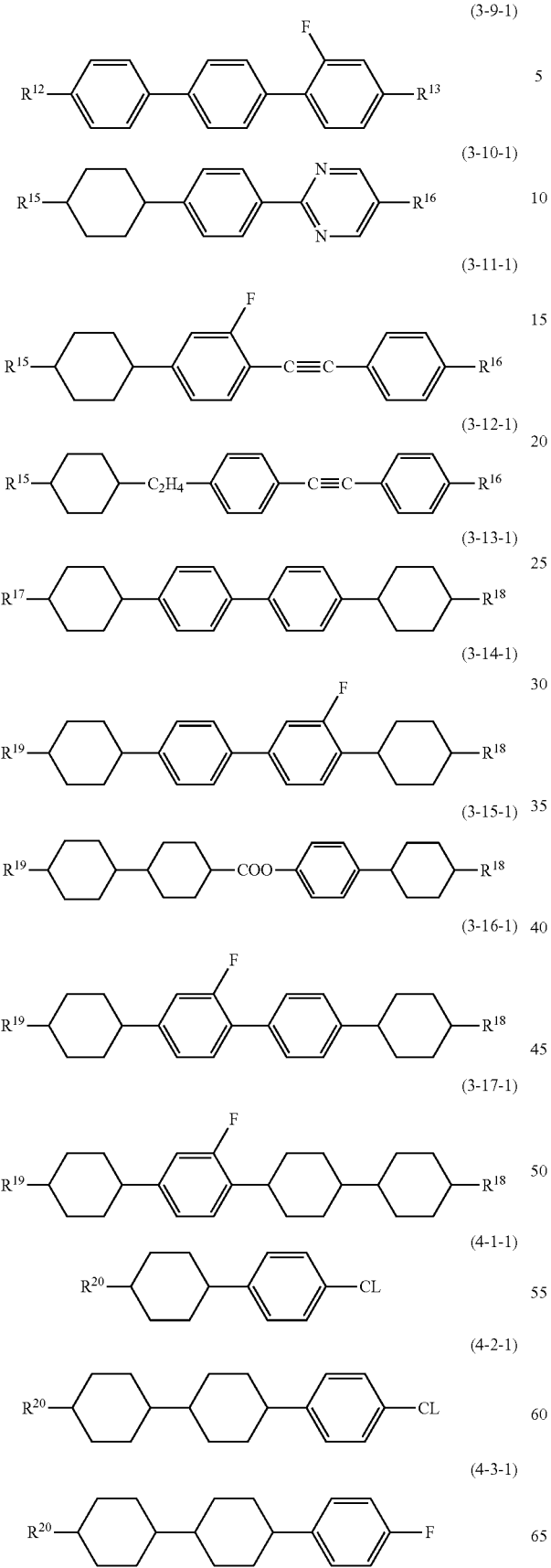
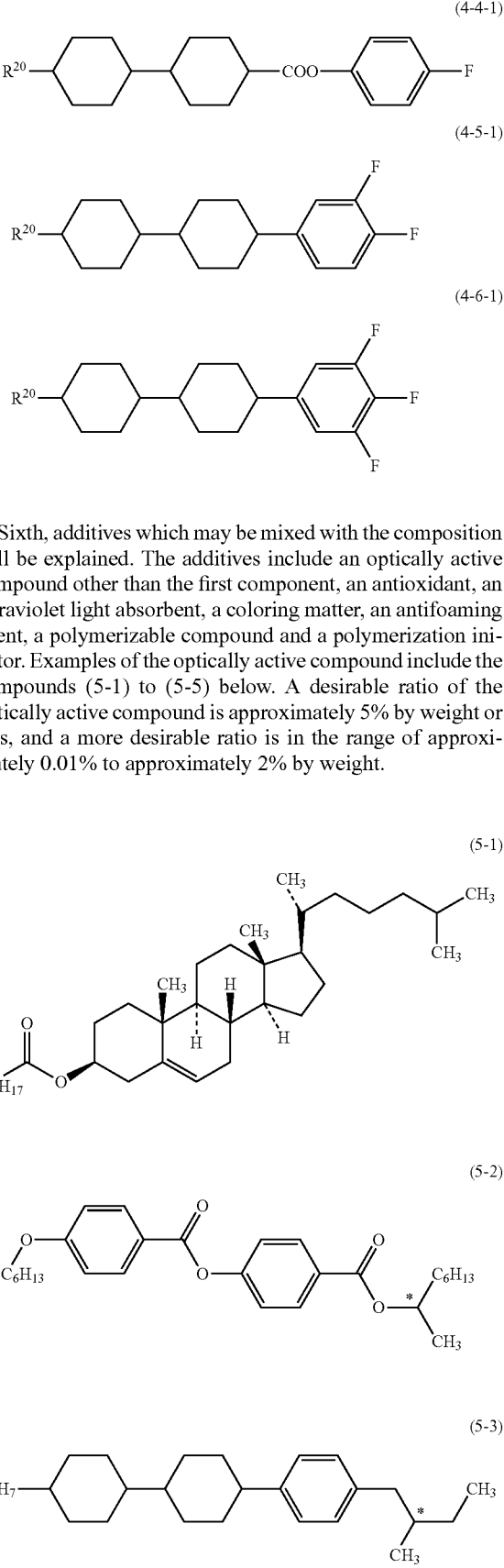

Sixth, additives which may be mixed with the composition will be explained. The additives include an optically active compound other than the first component, an antioxidant, an ultraviolet light absorbent, a coloring matter, an antifoaming agent, a polymerizable compound and a polymerization initiator. Examples of the optically active compound include the compounds (5-1) to (5-5) below. A desirable ratio of the optically active compound is approximately 5% by weight or less, and a more desirable ratio is in the range of approximately 0.01% to approximately 2% by weight.

-continued (5-4)
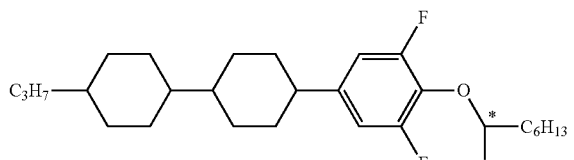

(5-5)
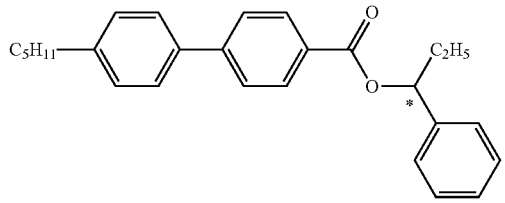

When an optically active compound other than the first component is added, it is desirable to have the same direction of twist with that of the first component, namely the compound (1), for decreasing the helical pitch of the composition. Incidentally, the compound (1) can be combined with a compound having the reverse direction of twist with that of the compound (1), for adjusting the temperature dependence of the helical pitch length in the composition.

An antioxidant is mixed with the composition in order to prevent a decrease in specific resistance caused by heating under air, or to maintain a large voltage holding ratio at room temperature and also at a temperature close to the maximum temperature of a nematic phase even after the device has been used for a long time.

Desirable examples of the antioxidant include the compound (6) where n is an integer of from 1 to 9. In the compound (6), desirable n is 1, 3, 5, 7 or 9. More desirable n is 1 or 7. The compound (6) where n is 1 is effective in preventing a decrease of the specific resistance caused by heating under air because it has a large volatility. The compound (6) where n is 7 is effective in maintaining a large voltage holding ratio at room temperature and also at a temperature close to the maximum temperature of a nematic phase even after the device has been used for a long time, because it has a small volatility. A desirable ratio of the antioxidant is approximately 50 ppm or more for achieving its effect and is approximately 600 ppm or less for avoiding a decrease of the maximum temperature or avoiding an increase of the minimum temperature. A more desirable ratio is in the range of approximately 100 ppm to approximately 300 ppm.

(6)
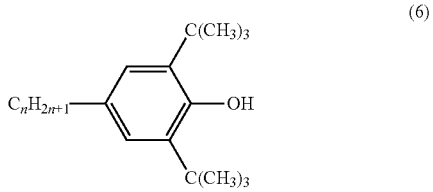

Desirable examples of the ultraviolet light absorbent include a benzophenone derivative, a benzoate derivative and a triazole derivative. A light stabilizer such as an amine having steric hindrance is also desirable. A desirable ratio of the ultraviolet light absorbent or the light stabilizer is approximately 50 ppm or more for achieving its effect and is approximately 10,000 ppm or less for avoiding a decrease of the maximum temperature or avoiding an increase of the minimum temperature. A more desirable ratio is in the range of approximately 100 ppm to approximately 10,000 ppm.

A dichroic dye such as an azo dye or an anthraquinone dye is mixed with the composition for adjusting to a device having a guest host (GH) mode. A desirable ratio of the coloring matter is in the range of approximately 0.01% to approximately 10% by weight. An antifoaming agent such as dimethyl silicone oil or methyl phenyl silicone oil is mixed with the composition for preventing foam formation. A desirable ratio of the antifoaming agent is approximately 1 ppm or more for achieving its effect and is approximately 1,000 ppm or less for avoiding a poor display. A more desirable ratio is in the range of approximately 1 ppm to approximately 500 ppm.

Seventh, methods for synthesizing the component compounds will be explained. These compounds can be prepared by known methods. The compound (1-1-1) is prepared by the method described in JP H06-200251 A (1994). The compound (2-1-1) is prepared by the method described in JP S53-023957 A (1978). The compound (2-3-3) is prepared by the method described in JP H04-300861 A (1992). The compound (3-1-1) and the compound (3-6-1) are prepared by the method described in JP H04-30382 B (1992). The compound (3-11-1) and the compound (3-12-1) are prepared by the method described in JP S63-152334 A (1988). The compound (4-4-1) is prepared by the method described in JP S56-135445 A (1981). An antioxidant is commercially available. The compound of formula (6) where n is 1 is available from Sigma-Aldrich Corporation. The compound (6) where n is 7, and so forth are prepared according to the method described in U.S. Pat. No. 3,660,505.

Compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Kouza, in Japanese title) (Maruzen Co., Ltd.). The composition is prepared according to known methods using the compounds thus obtained. For example, the component compounds are mixed and dissolved in each other by heating.

Last, use of the composition will be explained. The compositions mainly have a minimum temperature of approximately −20° C. or lower, a maximum temperature of approximately 70° C. or higher, and an optical anisotropy in the range of approximately 0.10 to approximately 0.20. The composition is suitable for a STN device. The composition is suitable especially for a STN device having a transmission type, a reflection type and a semi-transmission type. The composition having an optical anisotropy in the range of approximately 0.11 to approximately 0.25, and also in the range of approximately 0.13 to approximately 0.30 may be prepared by adjusting ratios of the component compounds or by mixing any other liquid crystal compound. The composition can be used as a composition having a nematic phase, and as an optically active composition by adding an optically active compound.

The composition can also be used for an AM device. The composition can also be used for a device having a mode such as PC, TN, ECB, OCB, IPS and VA. These devices may be of a reflection type, a transmission type or a semi-transmission type. The composition is also usable for a nematic curvilinear aligned phase (NCAP) device prepared by microcapsulating the composition, and for a polymer dispersed (PD) device in which a three-dimensional network-polymer is formed in the composition, for example a polymer network (PN) device.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

A composition and a compound were a subject for measurement in order to evaluate characteristics of the composition and the compound to be included in the composition. When the subject for measurement was a composition, the composition itself was measured as a sample, and the value obtained was described here. When the subject for measurement was a compound, a sample for measurement was prepared by mixing the compound (15% by weight) with mother liquid crystals (85% by weight). Characteristic values of the compound were calculated from values obtained by measurement, according to a method of extrapolation. That is: (extrapolated value)=[(measured value of a sample for measurement)−0.85×(measured value of mother liquid crystals)]/0.15. When a smectic phase (or crystals) separated out at this ratio at 25° C., the ratio of the compound to the mother liquid crystals was changed step by step in the order of (10% by weight/90% by weight), (5% by weight/95% by weight) and (1% by weight/99% by weight). Values of the maximum temperature, the optical anisotropy, the viscosity and the dielectric anisotropy with regard to the compound were obtained by the extrapolation.

The components of the mother liquid crystals were as follows. The ratio of each component is expressed as a percentage by weight.

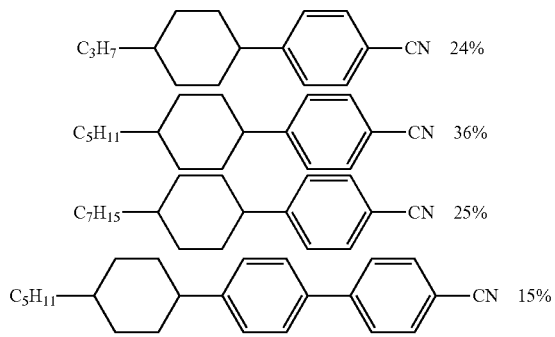

Characteristics were measured according to the following methods. Most methods are described in the Standards of Electronic Industries Association of Japan, EIAJ•ED-2521 A or those with some modifications. No TFT was attached to a TN device used for measurement.

Direction of Twist regarding Helix: A composition was prepared by adding a sample (1 part by weight) to mother liquid crystals (100 parts by weight) and the helical pitch ($P_1$) was measured. The standard sample of an optically active compound having a right-handed twist was added to the mother liquid crystals to give a composition having the helical pitch ($P_2$), where the amount of the standard sample was predetermined on the basis of calculation in order that the degree of $P_2$ might be the same with that of $P_1$. Then, these compositions were mixed in equal portions and the helical pitch ($P_{mix}$) was measured. The sample was determined to be a right-handed twist when the value of $P_{mix}$ was located between values of $P_1$ and $P_2$, and to be a left-handed twist when the value of $P_{mix}$ was substantially greater than that of $P_1$ (or $P_2$).

The standard optically active compound was as follows.

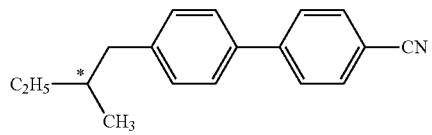

Maximum Temperature of a Nematic Phase (NI; ° C.): A sample was placed on a hot plate in a melting point apparatus equipped with a polarizing microscope and was heated at the rate of 1° C. per minute. Temperature was measured when part of the sample began to change from a nematic phase to an isotropic liquid. A higher limit of the temperature range of a nematic phase may occasionally be abbreviated to "the maximum temperature."

Minimum Temperature of a Nematic Phase (Tc; ° C.): A sample having a nematic phase was put in glass vials and then kept in freezers at temperatures of 0° C., −10° C., −20° C., −30° C. and −40° C. for 10 days, and then the liquid crystal phases were observed. For example, when the sample remained the nematic phase at −20° C. and changed to crystals or a smectic phase at −30° C., Tc was expressed as ≦−20° C. A lower limit of the temperature range of a nematic phase may occasionally be abbreviated to "the minimum temperature."

Viscosity (bulk viscosity; n; measured at 20° C.; mPa·s): Viscosity was measured by use of an E-type viscometer.

Viscosity (rotational viscosity; γ1; measured at 25° C.; mPa·s): Measurement was carried out according to the method described in M. Imai, et al., Molecular Crystals and Liquid Crystals, Vol. 259, 37 (1995). A sample was poured into a TN device in which the twist angle was 0 degrees and the distance between two glass substrates (cell gap) was 5 micrometers. A voltage with an increment of 0.5 volt in the range of 16 to 19.5 volts was applied stepwise to the TN device. After a period of 0.2 second with no voltage, a voltage was applied repeatedly under the conditions of only one rectangular wave (rectangular pulse; 0.2 second) and of no voltage (2 seconds). The peak current and the peak time of the transient current generated by the applied voltage were measured. The value of rotational viscosity was obtained from the measured values and the calculating equation (8) on page 40 of the paper presented by M. Imai, et al. The value of dielectric anisotropy necessary for this calculation was obtained by use of the device that had been used for the measurement of rotational viscosity, according to the method that will be described below.

Optical Anisotropy (refractive index anisotropy; Δn; measured at 25° C.): Measurement was carried out by use of an Abbe refractometer with a polarizing plate mounted on the ocular, on irradiation with light at a wavelength of 589 nanometers. The surface of the main prism was rubbed in one direction, and then a sample was dropped on the main prism. A refractive index (n∥) was measured when the direction of polarized light was parallel to that of the rubbing. A refractive index (n⊥) was measured when the direction of polarized light was perpendicular to that of the rubbing. The value of optical anisotropy was calculated from the equation: $\Delta n = n\| - n\perp$.

Dielectric Anisotropy ($\Delta\varepsilon$; measured at 25° C.): A sample was poured into a TN device in which the distance between two glass substrates (cell gap) was 9 micrometers and the twist angle was 80 degrees. Sine waves (10 V, 1 kHz) were applied to this device, and a dielectric constant ($\varepsilon\|$) in a major axis direction of liquid crystal molecules was measured after 2 seconds. Sine waves (0.5 V, 1 kHz) were applied to the device and a dielectric constant ($\varepsilon\perp$) in a minor axis direction of a liquid crystal molecule was measured after 2 seconds. The value of dielectric anisotropy was calculated from the equation: $\Delta\varepsilon = \varepsilon\| - \varepsilon\perp$.

Threshold Voltage (Vth; measured at 25° C.; V): Measurement was carried out with an LCD evaluation system Model LCD-5100 made by Otsuka Electronics Co., Ltd. The light source was a halogen lamp. A sample was poured into a STN device having a normally white mode, where the twist angle was 240 degrees, and the distance between two glass substrates (cell gap; d) was determined so that the product ($\Delta n \times d$) of the cell cap (d) and the optical anisotropy ($\Delta n$) of the composition was 0.85 micrometers. A voltage to be applied to the device (rectangular waves; 70 Hz) was stepwise increased in 0.02 V increments from 0 V up to 20 V. During the increase, the device was irradiated with light in the perpendicular direction, and the amount of light passing through the device was measured. A voltage-transmittance curve was prepared, in which the maximum amount of light corresponded to 100% transmittance and the minimum amount of light corresponded to 0% transmittance. The threshold voltage was voltage at 90% transmittance.

Steepness ($\gamma$; measured at 25° C.): Measurement was carried out with an LCD evaluation system Model LCD-5100 made by Otsuka Electronics Co., Ltd. The light source was a halogen lamp. A sample was poured into a STN device having a normally white mode, where the twist angle was 240 degrees, and the distance between two glass substrates (cell gap; d) was determined so that the product ($\Delta n \times d$) of the cell cap (d) and the optical anisotropy ($\Delta n$) of the composition was 0.85 micrometers. A voltage to be applied to the device (rectangular waves; 70 Hz) was stepwise increased in 0.02 V increments from 0 V up to 20 V. During the increase, the device was irradiated with light in the perpendicular direction, and the amount of light passing through the device was measured. A voltage-transmittance curve was prepared, in which the maximum amount of light corresponded to 100% transmittance and the minimum amount of light corresponded to 0% transmittance. The steepness was a value of voltage at 20% transmittance divided by that at 80% transmittance.

Response Time ($\tau$; measured at 25° C.; millisecond): Measurement was carried out with an LCD evaluation system Model LCD-5100 made by Otsuka Electronics Co., Ltd. The light source was a halogen lamp. The low-pass filter was set at 100 Hz. A sample was poured into a STN device having a normally white mode, where the twist angle was 240 degrees, and the distance between two glass substrates (cell gap; d) was determined so that the product ($\Delta n \times d$) of the cell cap (d) and the optical anisotropy ($\Delta n$) of the composition was 0.85 micrometers. To the device, OFF waveforms (70 Hz, V-max, 1 second) with $1/32$ duty-$1/6$ bias, $1/64$ duty-$1/8$ bias, $1/100$ duty-$1/11$ bias, $1/160$ duty-$1/13$ bias or $1/240$ duty-$1/16$ bias were applied. Then, to the device, ON waveforms (70 Hz, V-max, 1 second) with $1/32$ duty-$1/6$ bias, $1/64$ duty-$1/8$ bias, $1/100$ duty-$1/11$ bias, $1/160$ duty-$1/13$ bias or $1/240$ duty-$1/16$ bias were applied. Next, to the device, OFF waveforms (70 Hz, V-max, 1 second) with $1/32$ duty-$1/6$ bias, $1/64$ duty-$1/8$ bias, $1/100$ duty-$1/11$ bias, $1/160$ duty-$1/13$ bias or $1/240$ duty-$1/16$ bias were applied. The device was simultaneously irradiated with light in the perpendicular direction, and the amount of light passing through the device was measured. The maximum amount of light corresponded to 100% transmittance, and the minimum amount of light corresponded to 0% transmittance. A rise time ($\tau r$: rise time) was the period of time required for the change from 90% to 10% transmittance. A fall time ($\tau f$: fall time) was the period of time required for the change from 10% to 90% transmittance. The response time was the sum of the rise time and the fall time thus obtained.

Temperature Dependence of Threshold Voltage (Vth; measured at −20° C., 0° C., 20° C., 40° C., 60° C. and 80° C.; V): Measurement was carried out with an LCD evaluation system Model LCD-5100 made by Otsuka Electronics Co., Ltd. The light source was a halogen lamp. A sample was poured into a STN device having a normally white mode, where the twist angle was 240 degrees, and the distance between two glass substrates (cell gap; d) was determined so that the product ($\Delta n \times d$) of the cell gap (d) and the optical anisotropy ($\Delta n$) of the composition was 0.85 micrometer. A voltage to be applied to the device (rectangular waves; 70 Hz) was stepwise increased in 0.02 V increments from 0 V up to 20 V. During the increase, the device was irradiated with light in the perpendicular direction, and the amount of light passing through the device was measured. A voltage-transmittance curve was prepared, in which the maximum amount of light corresponded to 100% transmittance and the minimum amount of light corresponded to 0% transmittance. The temperature dependence of the threshold voltage was evaluated by use of a value of voltage at 50% transmittance at each temperature for measurement.

Helical pitch (P; measured at room temperature; micrometer): The helical pitch was measured according to the wedge method (see page 196 of Liquid Crystal Handbook (Ekishou Binran, in Japanese title; Maruzen, Co., LTD., 2000). After a sample had been injected into a wedge-shaped cell and the cell had been allowed to stand at room temperature for 2 hours, the interval (d2−d1) of disclination lines was observed with a polarizing microscope (Nikon Corporation, Model MM-40/60 series). The helical pitch (P) was calculated from the following equation, wherein $\theta$ was defined as the angle of the wedge cell. $P = 2 \times (d2-d1) \times \tan\theta$.

Frequency Dependence of Dielectric Anisotropy ($\Delta\varepsilon$ at 5 kHz/$\Delta\varepsilon$ at 50 Hz; at −20° C.): A sample was poured into a TN device in which the distance between two glass substrates (cell gap) was 9 micrometers and the twist angle was 80 degrees. The device was cooled at −20° C., sine waves (10 V, 5 kHz) were applied to the device, and then a dielectric constant ($\varepsilon\|$) in a major axis direction of liquid crystal molecules was measured. Sine waves (0.5 V, 5 kHz) were applied to the device, and a dielectric constant ($\varepsilon\perp$) in a minor axis direction of liquid crystal molecules was measured. The value of dielectric anisotropy ($\Delta\varepsilon$ at 5 kHz) was calculated from the equation: $\Delta\varepsilon = \varepsilon\| - \varepsilon\perp$. Next, sine waves of 50 Hz were applied to the device, and the value of dielectric anisotropy ($\Delta\varepsilon$ at 50 Hz) was obtained in a similar manner. The frequency dependence of the dielectric anisotropy was the ratio of values. When the ratio is close to 1 (one), the frequency dependence is small, that is to say, the frequency dependence is excellent. The frequency dependence of the dielectric anisotropy may occasionally be abbreviated to "the frequency dependence."

Elastic Constant Ratio (K33/K11; measured at 25° C.; pN): Measurement was carried out with an LCR meter Model HP 4284A made by Yokogawa-Hewlett-Packard Company. A sample was put in a homogeneous cell in which the distance between two glass substrates (cell gap) was 20 micrometers. An electric charge of 0 to 20 volts was applied to the cell, and electrostatic capacity and applied voltage were measured. The measured values of the electrostatic capacity (C) and the applied voltage (V) were fitted to formula (2.98) and formula (2.101) on page 75 of Liquid Crystal Device Handbook (Ekishou Debaisu Handobukku, in Japanese title; the Nikkan Kogyo Shimbun, Ltd.), giving values of K11 and K33. The elastic constant ratio was a value of K33 divided by K11.

Gas chromatographic analysis: A gas chromatograph Model GC-14B made by Shimadzu Corporation was used for measurement. The carrier gas was helium (2 milliliters per minute). The sample injector and the detector (FID) were set to 280° C. and 300° C., respectively. A capillary column DB-1 (length 30 meters, bore 0.32 millimeter, film thickness 0.25 micrometer, dimethylpolysiloxane as the stationary phase, non-polar) made by Agilent Technologies, Inc. was used for the separation of component compounds. After the column had been kept at 200° C. for 2 minutes, it was further heated to 280° C. at the rate of 5° C. per minute. A sample was dissolved in acetone (0.1% by weight), and 1 microliter of the solution was injected into the sample injector. A recorder used was a Model C-R5A Chromatopac Integrator made by Shimadzu Corporation or its equivalent. A gas chromatogram obtained showed the retention time of peaks and the peak areas corresponding to the component compounds.

Solvents for diluting the sample may also be chloroform, hexane and so forth. The following capillary columns may also be used in order to separate the component compounds: HP-1 made by Agilent Technologies Inc. (length 30 meters, bore 0.32 millimeter, film thickness 0.25 micrometer), Rtx-1 made by Restek Corporation (length 30 meters, bore 0.32 millimeter, film thickness 0.25 micrometer), and BP-1 made by SGE International Pty. Ltd. (length 30 meters, bore 0.32 millimeter, film thickness 0.25 micrometer). A capillary column CBP1-M50-025 (length 50 meters, bore 0.25 millimeter, film thickness 0.25 micrometer) made by Shimadzu Corporation may also be used for the purpose of avoiding an overlap of peaks of the compounds.

The ratio of the liquid crystal compounds included in the composition may be calculated according to the following method. The liquid crystal compounds are detected by use of a gas chromatograph. The ratio of peak areas in the gas chromatogram corresponds to the ratio (molar ratio) of the liquid crystal compounds. When the capillary columns described above are used, the correction coefficient of respective liquid crystal compounds may be regarded as one. Accordingly, the ratio (weight ratio) of the liquid crystal compound can be calculated from the ratio of peak areas.

The invention will be explained in detail by way of Examples. The invention is not limited by Examples described below. The compounds described in Comparative Examples and Examples were expressed as symbols according to the definition in the following Table 3. In Table 3, the configuration of 1,4-cyclohexylene is trans. A parenthesized number next to the symbolized compound in Example corresponds to a compound number. The symbol (-) means any other liquid crystal compound. Ratios (percentage) of liquid crystal compounds are expressed as percentages by weight (% by weight) based on the total weight of the liquid crystal composition. The liquid crystal composition further includes an impurity. Last, characteristics of the composition are summarized.

TABLE 3

Method of Description of Compound using Symbols
R—(A)—$Z_1$—...—$Z_n$—($A_n$)—R'

| 1) Left-Terminal Group R— | Symbol |
|---|---|
| $C_nH_{2n+1}$— | n— |
| $C_nH_{2n+1}O$— | nO— |
| $C_mH_{2m+1}OC_nH_{2n}$— | mOn— |
| $CH_2$=CH— | V— |
| $C_nH_{2n+1}$—CH=CH— | nV— |
| $CH_2$=CH—$C_nH_{2n}$— | Vn— |
| $C_mH_{2m+1}$—CH=CH—$C_nH_{2n}$— | mVn— |
| $CF_2$=CH— | VFF— |
| $CF_2$=CH—$C_nH_{2n}$— | VFFn— |

| 2) Right-Terminal Group —R' | Symbol |
|---|---|
| —$C_nH_{2n+1}$ | —n |
| —$OC_nH_{2n+1}$ | —On |
| —CH=$CH_2$ | —V |
| —CH=CH—$C_nH_{2n+1}$ | —Vn |
| —$C_nH_{2n}$—CH=$CH_2$ | —nV |
| —CH=$CF_2$ | —VFF |
| —CN | —C |
| —F | —F |
| —Cl | —CL |
| —$OCF_3$ | —OCF3 |

| 3) Bonding Group —$Z_n$— | Symbol |
|---|---|
| —$C_2H_4$— | 2 |
| —COO— | E |
| —CH=CH— | V |
| —C≡C— | T |
| —$CF_2O$— | X |
| —CH=CH—$CF_2O$— | VX |

| 4) Ring Structure —$A_n$— | Symbol |
|---|---|
| 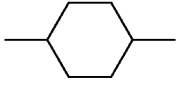 | H |
|  | B |
| 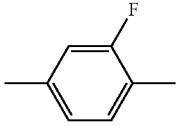 | B(F) |
| 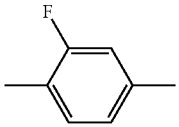 | B(2F) |
| 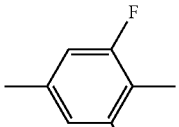 | B(F,F) |
| 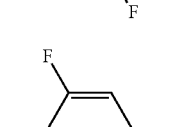 | B(2F,5F) |

TABLE 3-continued

Method of Description of Compound using Symbols
R—(A)—Z$_1$— . . . —Z$_n$—(A$_n$)—R'

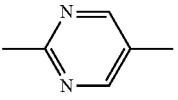  Py

  dh

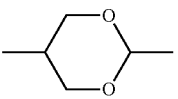  G

5) Example of Description

Example 1. 3-HB—C

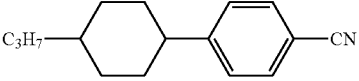

Example 2. 3-HB(F)TB-2

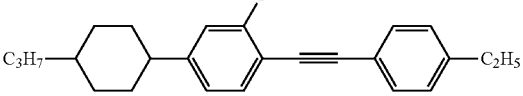

Example 3. 3-HH-4

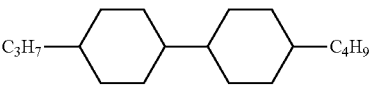

Example 4. 1V2-BEB(F,F)—C

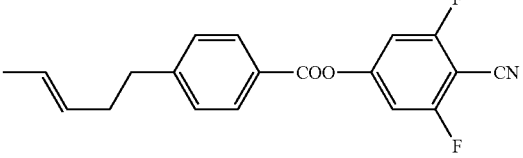

Comparative Example 1

| | | |
|---|---|---|
| 3-HB(F)-C | (2-1-2) | 27% |
| 1V2-BEB(F,F)-C | (2-3-3) | 9% |
| VFF-HHB-1 | (3-6-1) | 10% |
| VFF2-HHB-1 | (3-6-1) | 22% |
| 3-HB(F)TB-2 | (3-11-1) | 6% |
| 3-HB(F)TB-3 | (3-11-1) | 6% |
| 3-H2BTB-2 | (3-12-1) | 4% |
| 3-H2BTB-3 | (3-12-1) | 4% |
| 1O1-HBBH-4 | (3-13-1) | 5% |
| 1O1-HBBH-5 | (3-13-1) | 7% |

One part by weight of the following compound (a right-handed twist) that is different from the first component of the invention was added to 100 parts by weight of the composition above.

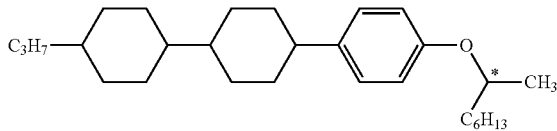

NI=112.2° C.; Tc≦−30° C.; Δn=0.150; Δ∈=10.8; Vth=1.65 V; η=31.4 mPa·s; γ1=213.8 mPa·s; P=95.2 μm.

Example 1

| | | |
|---|---|---|
| 3-HB-C | (2-1-1) | 8% |
| V2-HB-C | (2-1-1) | 8% |
| 1V2-HB-C | (2-1-1) | 8% |
| 3-BEB(F)-C | (2-3-2) | 8% |
| V-HH-3 | (3-1-1) | 14% |
| 1V-HH-3 | (3-1-1) | 7% |
| 3-HB-O2 | (3-2-1) | 3% |
| V-HHB-1 | (3-6-1) | 8% |
| V2-HHB-1 | (3-6-1) | 7% |
| 3-HHB-1 | (3-6-1) | 5% |
| 3-H2BTB-2 | (3-12-1) | 6% |
| 3-H2BTB-3 | (3-12-1) | 6% |
| 3-H2BTB-4 | (3-12-1) | 5% |
| 3-HHEB-F | (4-4-1) | 7% |

One part by weight of the following compound (1-1-1; a left-handed twist) was added to 100 parts by weight of the composition above.

(1-1-1)

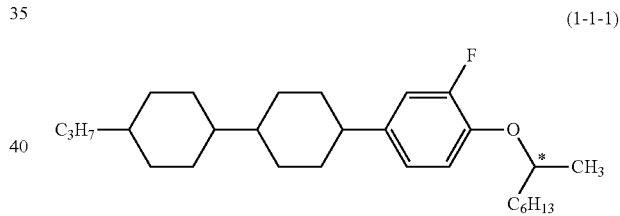

NI=97.7° C.; Tc≦30° C.; Δn=0.132; Δ∈=5.2; Vth=2.19 V; η=12.6 mPa·s; γ1=85.4 mPa·s; P=14.7 μm.

Example 2

| | | |
|---|---|---|
| 3-HB-C | (2-1-1) | 30% |
| 2-BB-C | (2-2-1) | 10% |
| 2-BEB-C | (2-3-1) | 4% |
| 2-HHB(F)-C | (2-6-2) | 3% |
| 3-HHB(F)-C | (2-6-2) | 4% |
| 3-HB-O2 | (3-2-1) | 10% |
| 3-HHB-1 | (3-6-1) | 4% |
| VFF-HHB-1 | (3-6-1) | 3% |
| VFF2-HHB-1 | (3-6-1) | 18% |
| 3-HB(F)TB-2 | (3-11-1) | 5% |
| 3-HB(F)TB-3 | (3-11-1) | 5% |
| 3-HB(F)TB-4 | (3-11-1) | 4% |

One part by weight of the following compound (1-2-1; a left-handed twist) was added to 100 parts by weight of the composition above.

(1-2-1)

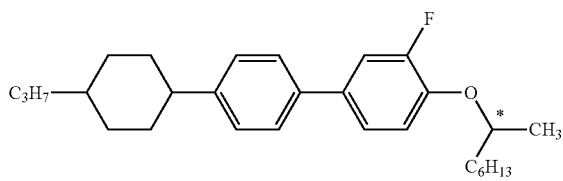

NI=89.8° C.; Tc≦−30° C.; Δn=0.155; Δ∈=7.2; Vth=1.95 V; η=19.4 mPa·s; γ1=134.6 mPa·s; P=14.2 μm.

Example 3

| 2-HB-C | (2-1-1) | 5% |
| 3-HB-C | (2-1-1) | 12% |
| 3-HB-O2 | (3-2-1) | 15% |
| 1-BTB-3 | (3-4-1) | 3% |
| 3-HHB-1 | (3-6-1) | 8% |
| 3-HHB-O1 | (3-6-1) | 5% |
| 3-HHB-3 | (3-6-1) | 14% |
| 3-HHB-F | (4-3-1) | 4% |
| 3-HHEB-F | (4-4-1) | 4% |
| 5-HHEB-F | (4-4-1) | 4% |
| 2-HHB(F)-F | (4-5-1) | 7% |
| 3-HHB(F)-F | (4-5-1) | 7% |
| 5-HHB(F)-F | (4-5-1) | 7% |
| 3-HHB(F,F)-F | (4-6-1) | 5% |

0.8 Part by weight of the following compound (1-3-1; a left-handed twist) was added to 100 parts by weight of the composition above.

(1-3-1)

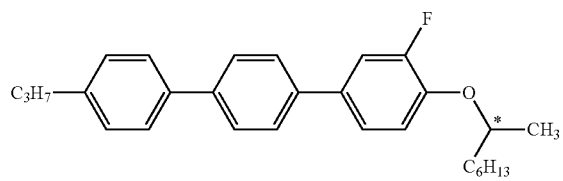

NI=94.0° C.; Tc≦−30° C.; Δn=0.107; Δ∈=3.3; Vth=2.64 V; η=16.9 mPa·s; γ1=116.4 mPa·s; P=20.4 μm.

Example 4

| 3-HB(F,F)-C | (2-1-3) | 8% |
| V2-BEB(F,F)-C | (2-3-3) | 9% |
| VFF-HH-3 | (3-1-1) | 12% |
| 2-BTB-1 | (3-4-1) | 5% |
| 2-BTB-O1 | (3-4-1) | 4% |
| 2-HHB-1 | (3-6-1) | 5% |
| 3-HHB-1 | (3-6-1) | 5% |
| VFF2-HHB-1 | (3-6-1) | 17% |
| 3-HB(F)TB-2 | (3-11-1) | 8% |
| 3-HB(F)TB-3 | (3-11-1) | 7% |
| 3-HB(F)TB-4 | (3-11-1) | 7% |
| 2-H2BTB-2 | (3-12-1) | 3% |
| 3-H2BTB-2 | (3-12-1) | 5% |
| 3-H2BTB-3 | (3-12-1) | 5% |

0.4 Part by weight of the following compound (1-1-1; a left-handed twist) was added to 100 parts by weight of the composition above.

(1-1-1)

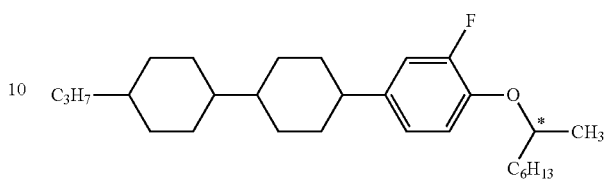

NI=98.6° C.; Tc≦−30° C.; Δn=0.163; Δ∈=8.6; Vth=1.92 V; η=13.2 mPa·s; γ1=91.9 mPa·s; P=36.4 μm.

Example 5

| 1V2-HB-C | (2-1-1) | 11% |
| 3-HB-C | (2-1-1) | 30% |
| 1V2-BEB(F,F)-C | (2-3-3) | 5% |
| 2-HHB-C | (2-6-1) | 5% |
| 3-HHB-C | (2-6-1) | 5% |
| VFF-HH-5 | (3-1-1) | 13% |
| 3-HH-4 | (3-1-1) | 8% |
| 3-HHB-1 | (3-6-1) | 6% |
| 3-HHB-O1 | (3-6-1) | 3% |
| 3-HB(F)TB-2 | (3-11-1) | 7% |
| 1O1-HBBH-4 | (3-13-1) | 3% |
| 1O1-HBBH-5 | (3-13-1) | 4% |

0.7 Part by weight of the following compound (1-2-1; a left-handed twist) was added to 100 parts by weight of the composition above.

(1-2-1)

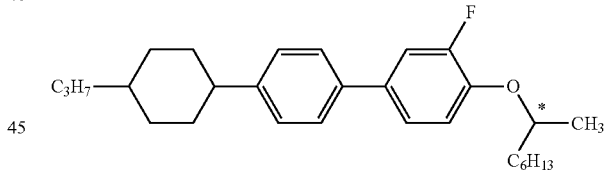

NI=96.9° C.; Tc≦−30° C.; Δn=0.135; Δ∈=7.9; Vth=2.06 V; η=21.2 mPa·s; γ1=133.7 mPa·s; P=20.5 μm.

Example 6

| 3-HB(F)-C | (2-1-2) | 24% |
| 1V2-BEB(F,F)-C | (2-3-3) | 8% |
| 2-HB(F)EB(F)-C | (2-7-1) | 3% |
| 3-HB(F)EB(F)-C | (2-7-1) | 3% |
| 3-HH-4 | (3-1-1) | 20% |
| 1-BTB-3 | (3-4-1) | 5% |
| VFF-HHB-1 | (3-6-1) | 6% |
| VFF2-HHB-1 | (3-6-1) | 9% |
| 3-HB(F)TB-2 | (3-11-1) | 6% |
| 3-HB(F)TB-3 | (3-11-1) | 6% |
| 5-HBBH-3 | (3-13-1) | 4% |
| 3-HHEB-F | (4-4-1) | 3% |
| 5-HHEB-F | (4-4-1) | 3% |

0.6 Part by weight of the following compound (1-1-1; a left-handed twist) was added to 100 parts by weight of the composition above.

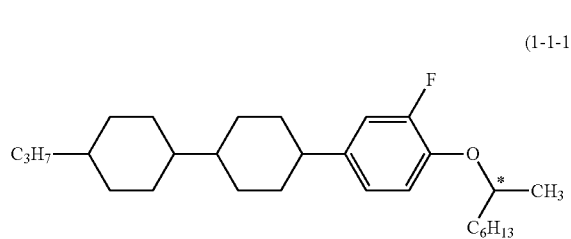
(1-1-1)

NI=82.1° C.; Tc≦20° C.; Δn=0.125; Δ∈=11.3; Vth=1.65 V; η=20.9 mPa·s; γ1=128.5 mPa·s; P=26.2 μm.

Example 7

| | | |
|---|---|---|
| 3-HB-C | (2-1-1) | 25% |
| 2-HB(F)-C | (2-1-2) | 7% |
| 3-HB(F)-C | (2-1-2) | 15% |
| 2-BTB-1 | (3-4-1) | 9% |
| 3-HHB-1 | (3-6-1) | 8% |
| 3-HHB-3 | (3-6-1) | 11% |
| 3-HHB-O1 | (3-6-1) | 4% |
| 3-HBPy-2 | (3-10-1) | 5% |
| 3-HBPy-3 | (3-10-1) | 4% |
| 3-HBPy-4 | (3-10-1) | 4% |
| 3-HHB-CL | (4-2-1) | 4% |
| 5-HHB-CL | (4-2-1) | 4% |

0.3 Part by weight of the following compound (1-2-1; a right-handed twist) was added to 100 parts by weight of the composition above.

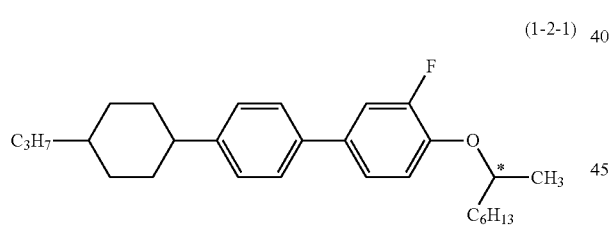
(1-2-1)

NI=81.4° C.; Tc≦−20° C.; Δn=0.134; Δ∈=6.4; Vth=2.05 V; η=20.4 mPa·s; γ1=125.4 mPa·s; P=49.3 μm.

Example 8

| | | |
|---|---|---|
| 3-HB-C | (2-1-1) | 16% |
| 1V2-BEB(F,F)-C | (2-3-3) | 10% |
| 3-HEB(F,F)-C | (2-5-1) | 8% |
| VFF-HH-5 | (3-1-1) | 25% |
| 7-HB-1 | (3-2-1) | 5% |
| VFF-HHB-1 | (3-6-1) | 5% |
| VFF2-HHB-1 | (3-6-1) | 12% |
| 3-HB(F)TB-2 | (3-11-1) | 5% |
| 3-H2BTB-2 | (3-12-1) | 4% |
| 5-HBB(F)B-2 | (3-14-1) | 5% |
| 5-HBB(F)B-3 | (3-14-1) | 5% |

0.5 Part by weight of the following compound (1-2-1; a left-handed twist) was added to 100 parts by weight of the composition above.

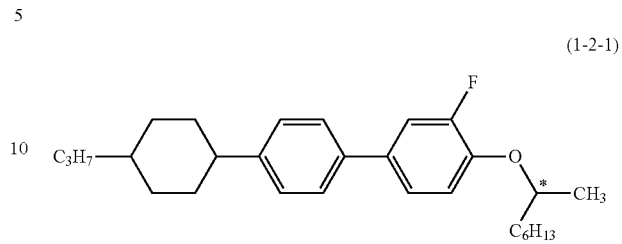
(1-2-1)

NI=80.3° C.; Tc≦20° C.; Δn=0.127; Δ∈=10.3; Vth=1.63 V; η=15.9 mPa·s; γ1=98.9 mPa·s; P=31.3 μm.

Example 9

| | | |
|---|---|---|
| 3-HB-C | (2-1-1) | 15% |
| 3-BEB(F)-C | (2-3-2) | 5% |
| 5-BEB(F)-C | (2-3-2) | 5% |
| 5-B(F,F)EB(F)-C | (2-4-1) | 5% |
| 3-HH-4 | (3-1-1) | 8% |
| V2-BB-1 | (3-3-1) | 4% |
| 2-BTB-1 | (3-4-1) | 7% |
| 3-HHB-1 | (3-6-1) | 4% |
| 3-HHB-3 | (3-6-1) | 4% |
| 5-HBB-2 | (3-7-1) | 4% |
| 3-HB(F)TB-2 | (3-11-1) | 6% |
| 3-HB(F)TB-3 | (3-11-1) | 6% |
| 3-H2BTB-2 | (3-12-1) | 5% |
| 3-H2BTB-3 | (3-12-1) | 4% |
| 3-H2BTB-4 | (3-12-1) | 4% |
| 5-HB-CL | (4-1-1) | 4% |
| 3-HHEB-F | (4-4-1) | 5% |
| 5-HHEB-F | (4-4-1) | 5% |

0.7 Part by weight of the following compound (1-1-1; a left-handed twist) and 0.7 Part by weight of the following compound (1-2-1; a left-handed twist) were added to 100 parts by weight of the composition above.

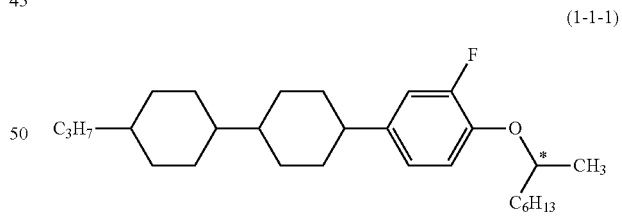
(1-1-1)

NI=89.3° C.; Tc≦−20° C.; Δn=0.156; Δ∈=7.6; Vth=1.99 V; η=16.2 mPa·s; γ1=99.8 mPa·s; P=9.1 μm.

Example 10

| | | |
|---|---|---|
| 3-HB-C | (2-1-1) | 20% |
| 3-HB(F)-C | (2-1-2) | 18% |
| 1V2-BEB(F,F)-C | (2-3-3) | 5% |
| VFF-HH-5 | (3-1-1) | 18% |
| 3-HHEH-3 | (3-5-1) | 3% |

| | | |
|---|---|---|
| 3-HHEH-5 | (3-5-1) | 3% |
| 2-BB(F)B-3 | (3-8-1) | 4% |
| 3-HB(F)TB-2 | (3-11-1) | 6% |
| 3-HB(F)TB-3 | (3-11-1) | 6% |
| 3-H2BTB-2 | (3-12-1) | 4% |
| 3-H2BTB-3 | (3-12-1) | 4% |
| 3-HHEBH-3 | (3-15-1) | 3% |
| 3-HHEBH-4 | (3-15-1) | 3% |
| 3-HHEBH-5 | (3-15-1) | 3% |

0.4 Part by weight of the following compound (1-2-1; a left-handed twist) was added to 100 parts by weight of the composition above.

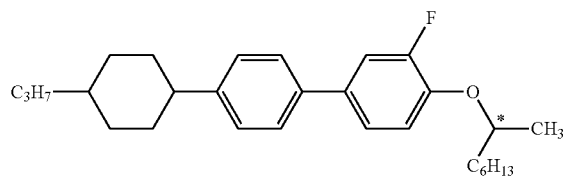

(1-2-1)

NI=88.5° C.; Tc≦−20° C.; Δn=0.135; Δ∈=8.4; Vth=1.88 V; η=20.7 mPa·s; γ1=129.5 mPa·s; P=37.9 μm.

Example 11

| | | |
|---|---|---|
| 3-HB(F)-C | (2-1-2) | 30% |
| V2-BEB(F,F)-C | (2-3-3) | 8% |
| V-HH-3 | (3-1-1) | 20% |
| V-HHB-1 | (3-6-1) | 9% |
| 1-BB(F)B-2V | (3-8-1) | 6% |
| 2-BB(F)B-2V | (3-8-1) | 4% |
| 2-BBB(2F)-3 | (3-9-1) | 4% |
| 3-HB(F)TB-2 | (3-11-1) | 3% |
| 3-HB(F)TB-3 | (3-11-1) | 3% |
| 3-H2BTB-2 | (3-12-1) | 3% |
| 3-H2BTB-3 | (3-12-1) | 3% |
| 3-HB(F)HH-5 | (3-17-1) | 7% |

0.6 Part by weight of the following compound (1-3-1; a left-handed twist) was added to 100 parts by weight of the composition above.

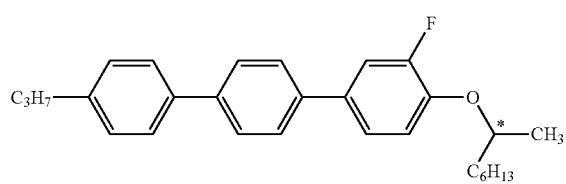

(1-3-1)

NI=76.5° C.; Tc≦−20° C.; Δn=0.133; Δ∈=10.0; Vth=1.85 V; η=15.4 mPa·s; γ1=97.6 mPa·s; P=26.5 μm.

Example 12

| | | |
|---|---|---|
| 1V2-HB-C | (2-1-1) | 5% |
| 3-HB(F)-C | (2-1-2) | 24% |
| VFF-HH-5 | (3-1-1) | 27% |
| 2-BTB-1 | (3-4-1) | 3% |
| 3-HHB-1 | (3-6-1) | 6% |
| 3-HHB-3 | (3-6-1) | 9% |
| 3-HHB-O1 | (3-6-1) | 3% |
| 3-HB(F)TB-2 | (3-11-1) | 6% |
| 3-HB(F)TB-3 | (3-11-1) | 5% |
| 3-H2BTB-2 | (3-12-1) | 4% |
| 3-HB(F)BH-3 | (3-16-1) | 4% |
| 5-HB(F)BH-3 | (3-16-1) | 4% |

0.8 Part by weight of the following compound (1-2-1; a left-handed twist) was added to 100 parts by weight of the composition above.

(1-2-1)

NI=89.2° C.; Tc≦−30° C.; Δn=0.124; Δ∈=5.4; Vth=2.42 V; η=13.3 mPa·s; γ1=86.4 mPa·s; P=19.2 μm.

Example 13

| | | |
|---|---|---|
| 3-HB-C | (2-1-1) | 18% |
| 5-HBXB(F,F)-C | (2) | 3% |
| 3-HB(F,F)XB(F,F)-C | (2) | 3% |
| VFF-HH-5 | (3-1-1) | 30% |
| 2-BTB-1 | (3-4-1) | 10% |
| VFF-HHB-1 | (3-6-1) | 8% |
| VFF2-HHB-1 | (3-6-1) | 11% |
| 3-HHB-1 | (3-6-1) | 4% |
| 3-H2BTB-2 | (3-12-1) | 5% |
| 3-H2BTB-3 | (3-12-1) | 4% |
| 3-H2BTB-4 | (3-12-1) | 4% |

0.7 Part by weight of the following compound (1-1-1; a left-handed twist) was added to 100 parts by weight of the composition above.

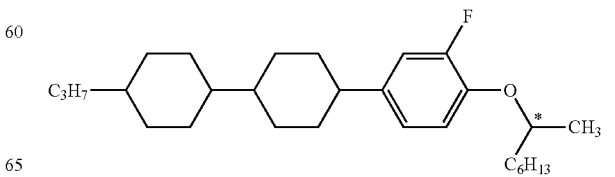

(1-1-1)

NI=82.3° C.; Tc≦−20° C.; Δn=0.130; Δε=4.2; Vth=2.55 V; η=12.3 mPa·s; γ1=79.5 mPa·s; P=21.6 μm.

Example 14

| 3-HB-C | (2-1-1) | 25% |
| --- | --- | --- |
| 2-BB-C | (2-2-1) | 9% |
| 2-HHB-C | (2-6-1) | 4% |
| 3-HHB-C | (2-6-1) | 4% |
| 3-HH-4 | (3-1-1) | 12% |
| 3-HB-O2 | (3-2-1) | 12% |
| 3-HHB-1 | (3-6-1) | 7% |
| 3-HHB-3 | (3-6-1) | 10% |
| 3-HB(F)TB-2 | (3-11-1) | 8% |
| 3-HHB(F)-F | (4-5-1) | 5% |
| 3-PyBB-F | (—) | 4% |

0.4 Part by weight of the following compound (1-2-1; a left-handed twist) was added to 100 parts by weight of the composition above.

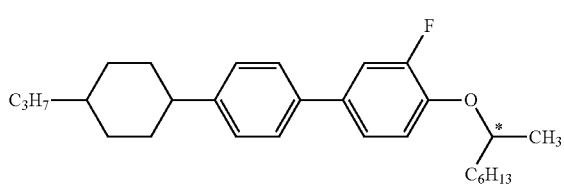

(1-2-1)

NI=90.2° C.; Tc≦−30° C.; Δn=0.135; Δε=4.8; Vth=2.45 V; η=15.5 mPa·s; γ1=101.2 mPa·s; P=37.8 μm.

The compositions in Examples 1 to 14 had a short helical pitch and a small viscosity in comparison with Comparative Example 1. Thus, the liquid crystal composition of the invention was so much superior in characteristics to the composition shown in Comparative Example 1.

APPLICABILITY IN INDUSTRY

The invention is a liquid crystal composition that satisfies at least one of characteristics such as a high maximum temperature of a nematic phase, a low minimum temperature of a nematic phase, a small viscosity, a suitable optical anisotropy, a large dielectric anisotropy, a large elastic constant ratio, a small temperature dependence of the threshold voltage, a small frequency dependence of the dielectric anisotropy and a short helical pitch, or that is suitably balanced regarding at least two of the characteristics. A liquid crystal device that contains the composition is suitable for a STN device, because it has a short response time, a large contrast ratio, a low threshold voltage, a small electric power consumption, a steep voltage-transmission curve and a small light leak.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. A liquid crystal composition that has a nematic phase and comprises two components, wherein a first component is at least one optically active compound selected from the group of compounds represented by formula (1), and a second component is at least one compound selected from the group of compounds represented by formula (2):

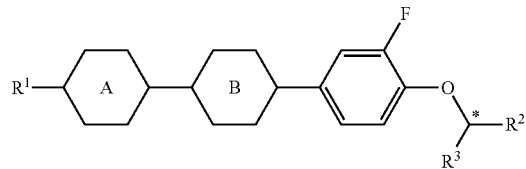

(1)

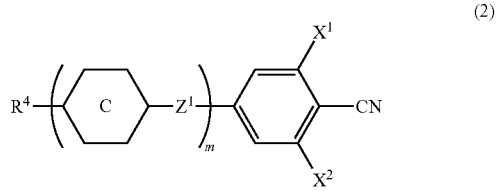

(2)

wherein $R^1$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; $R^2$ and $R^3$ are different each other, and are alkyl having 1 to 12 carbons or alkenyl having 2 to 12 carbons; $R^4$ is alkyl having 1 to 12 carbons, alkoxy having 1 to 12 carbons or alkenyl having 2 to 12 carbons; the ring A and the ring B are each independently 1,4-cyclohexylene or 1,4-phenylene; the ring C is independently 1,4-cyclohexylene, 1,4-phenylene, 2-fluoro-1,4-phenylene, 3-fluoro-1,4-phenylene, 3,5-difluoro-1,4-phenylene or 1,3-dioxane-2,5-diyl; $Z^1$ is independently carbonyloxy, difluoromethyleneoxy or a single bond; m is 1, 2 or 3; and $X^1$ and $X^2$ are each independently hydrogen or fluorine.

2. The liquid crystal composition according to claim 1, wherein the sum of the number of carbons of $R^2$ and $R^3$ in formula (1) is an integer from 3 to 10.

3. The liquid crystal composition according to claim 2, wherein the first component is at least one compound selected from the group of compounds represented by formula (1-1) to formula (1-3):

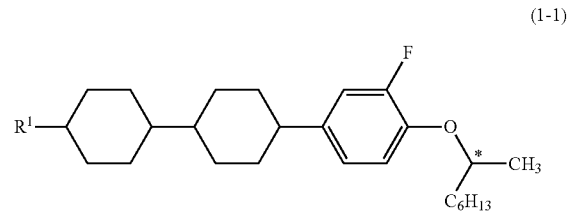

(1-1)

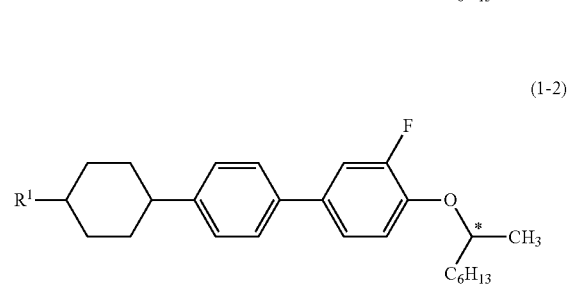

(1-2)

(1-3)

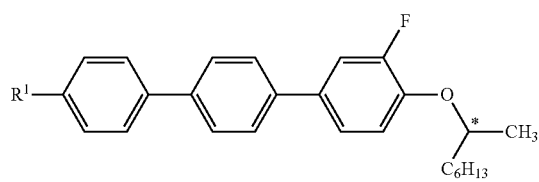

wherein $R^1$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

4. The liquid crystal composition according to claim 1, wherein the ratio of the first component is in the range of approximately 0.01 part to approximately 5 parts by weight based on 100 parts by weight of the liquid crystal composition excluding the first component.

5. The liquid crystal composition according to claim 1, wherein the second component is at least one compound selected from the group of compounds represented by formula (2-1) to formula (2-7):

(2-1)

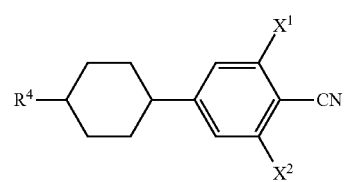

(2-2)

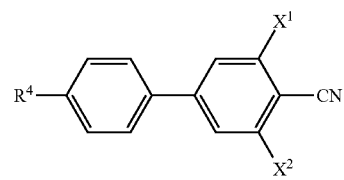

(2-3)

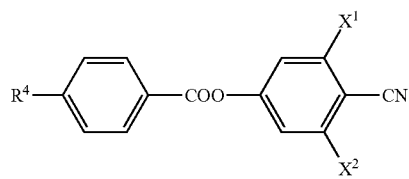

(2-4)

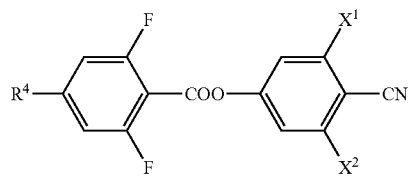

(2-5)

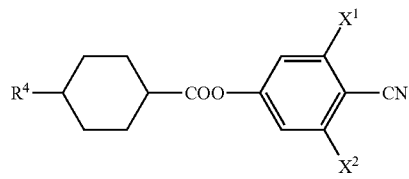

(2-6)

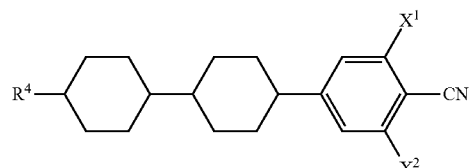

(2-7)

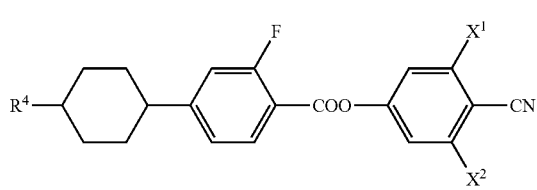

wherein $R^4$ is alkyl having 1 to 12 carbons, alkoxy having 1 to 12 carbons or alkenyl having 2 to 12 carbons; and $X^1$ and $X^2$ are each independently hydrogen or fluorine.

6. The liquid crystal composition according to claim 1, wherein the ratio of the second component is in the range of approximately 5% to approximately 70% by weight based on the weight of the liquid crystal composition excluding the first component.

7. The liquid crystal composition according to claim 1, further comprising at least one compound selected from the group of compounds represented by formula (3) as a third component:

(3)

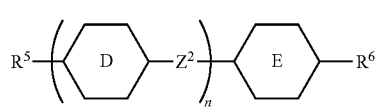

wherein $R^5$ and $R^6$ are each independently alkyl having 1 to 12 carbons, alkoxy having 1 to 12 carbons, alkenyl having 2 to 12 carbons, alkenyl having 2 to 12 carbons in which arbitrary hydrogen is replaced by fluorine or alkoxymethyl having 2 to 12 carbons; the ring D and the ring E are each independently 1,4-cyclohexylene, 1,4-phenylene, 2-fluoro-1,4-phenylene, 3-fluoro-1,4-phenylene, 2,5-difluoro-1,4-phenylene or pyrimidine-2,5-diyl; $Z^2$ is independently ethylene, ethynylene, carbonyloxy or a single bond; and n is 1, 2 or 3.

8. The liquid crystal composition according to claim 7, wherein the third component is at least one compound selected from the group of compounds represented by formula (3-1) to formula (3-17):

(3-1)

R⁵—⟨cyclohexyl⟩—⟨cyclohexyl⟩—R⁶

(3-2)

R⁵—⟨cyclohexyl⟩—⟨phenyl⟩—R⁶

(3-3)

R⁵—⟨phenyl⟩—⟨phenyl⟩—R⁶

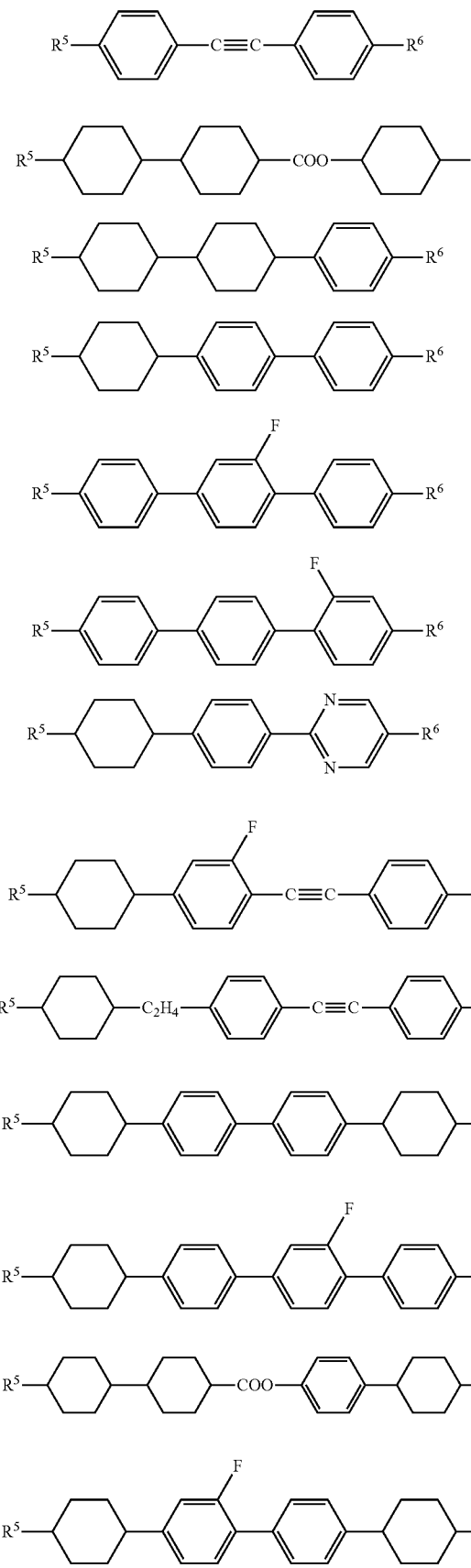

(3-4)
(3-5)
(3-6)
(3-7)
(3-8)
(3-9)
(3-10)
(3-11)
(3-12)
(3-13)
(3-14)
(3-15)
(3-16)

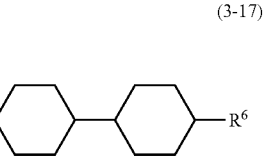

(3-17)

wherein $R^5$ and $R^6$ are each independently alkyl having 1 to 12 carbons, alkoxy having 1 to 12 carbons, alkenyl having 2 to 12 carbons, alkenyl having 2 to 12 carbons in which arbitrary hydrogen is replaced by fluorine or alkoxymethyl having 2 to 12 carbons.

9. The liquid crystal composition according to claim 7, wherein the ratio of the third component is in the range of approximately 30% to approximately 95% by weight based on the weight of the liquid crystal composition excluding the first component.

10. The liquid crystal composition according to claim 1, further comprising at least one compound selected from the group of compounds represented by formula (4) as a fourth component:

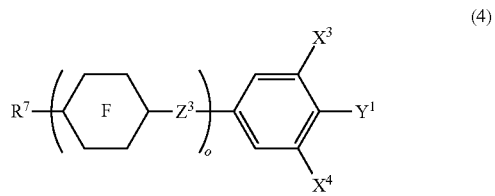

(4)

wherein $R^7$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; the ring F is independently 1,4-cyclohexylene or 1,4-phenylene; $Z^3$ is independently carbonyloxy or a single bond; o is 1 or 2; $X^3$ and $X^4$ are each independently hydrogen or fluorine; and $Y^1$ is chlorine or fluorine.

11. The liquid crystal composition according to claim 7, further comprising at least one compound selected from the group of compounds represented by formula (4) as a fourth component:

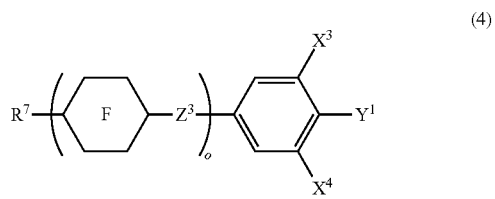

(4)

wherein $R^7$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; the ring F is independently 1,4-cyclohexylene or 1,4-phenylene; $Z^3$ is independently carbonyloxy or a single bond; o is 1 or 2; $X^3$ and $X^4$ are each independently hydrogen or fluorine; and $Y^1$ is chlorine or fluorine.

12. The liquid crystal composition according to claim 10, wherein the fourth component is at least one compound selected from the group of compounds represented by formula (4-1) to formula (4-6):

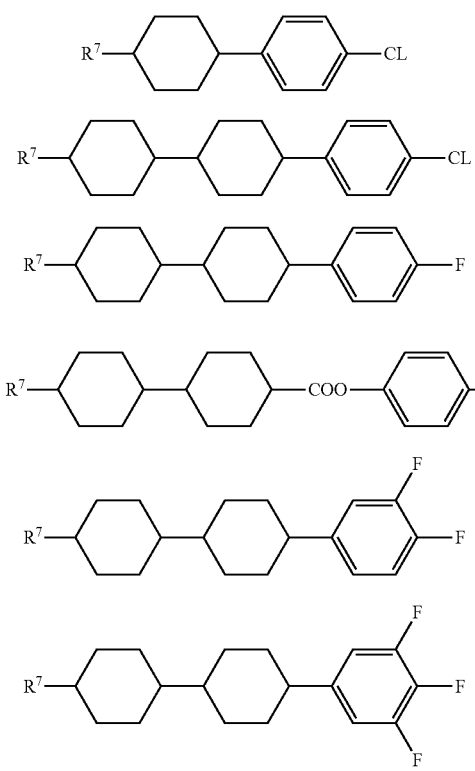

wherein $R^7$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

13. The liquid crystal composition according to claim 11, wherein the fourth component is at least one compound selected from the group of compounds represented by formula (4-1) to formula (4-6):

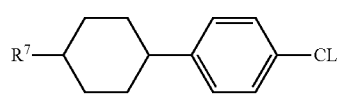

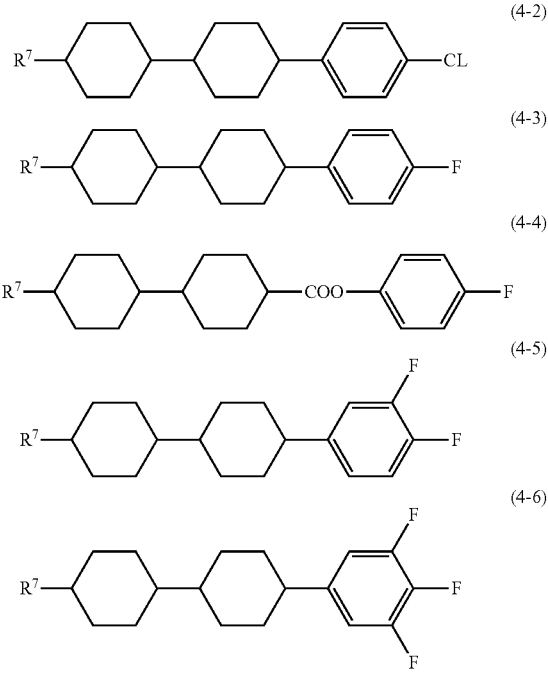

wherein $R^7$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

14. The liquid crystal composition according to claim 10, wherein the ratio of the fourth component is in the range of approximately 5% to approximately 50% by weight based on the weight of the liquid crystal composition excluding the first component.

15. The liquid crystal composition according to claim 11, wherein the ratio of the fourth component is in the range of approximately 5% to approximately 50% by weight based on the weight of the liquid crystal composition excluding the first component.

16. A liquid crystal display device containing the liquid crystal composition according to claim 1.

* * * * *